United States Patent
Floyd et al.

(10) Patent No.: US 9,602,414 B2
(45) Date of Patent: Mar. 21, 2017

(54) APPARATUS AND METHODS FOR CONTROLLED BANDWIDTH RECLAMATION

(75) Inventors: Brian Floyd, Charlotte, NC (US); Matt Smith, San Diego, CA (US); Stephanie Trotter, Highlands Ranch, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 756 days.

(21) Appl. No.: 13/024,246

(22) Filed: Feb. 9, 2011

(65) Prior Publication Data

US 2012/0203822 A1 Aug. 9, 2012

(51) Int. Cl.
G06F 15/16 (2006.01)
H04L 12/815 (2013.01)
H04L 12/24 (2006.01)

(52) U.S. Cl.
CPC .......... H04L 47/22 (2013.01); H04L 41/0896 (2013.01)

(58) Field of Classification Search
CPC . H04L 41/0896; H04L 12/5695; H04L 47/10; H04L 47/821; H04L 47/806; H04L 41/5051; H04L 65/4069; H04L 67/322; H04N 21/2402; H04N 21/47202; H04N 21/2385; H04N 21/26216; H04N 7/17309
(Continued)

(56) References Cited

U.S. PATENT DOCUMENTS 5,226,901 A 7/1993 Dhaliwal et al.
5,410,344 A 4/1995 Graves et al.
(Continued)

FOREIGN PATENT DOCUMENTS

JP A-2005-519365 6/2005
JP A-2005-519501 6/2005
(Continued)

OTHER PUBLICATIONS

Enhanced TV Binary Interchange. Format 1.0 OC-SP-ETV-BIF1. 0-104-070921 Date: Sep. 21, 2007. 420 pages.
(Continued)

*Primary Examiner* — Farid Homayounmehr
*Assistant Examiner* — Lizbeth Torres-Diaz
(74) *Attorney, Agent, or Firm* — Gazdzinski & Associates, PC

(57) ABSTRACT

Apparatus and methods for control of bandwidth reclamation in a content distribution network. In one embodiment, the invention provides a network operator or subscriber with the ability to disable or otherwise control reclamation in a switched digital video (SDV) network. A controller uses rules in determining whether to reclaim bandwidth. These rules designate certain carriers, content, devices and/or subscribers as high priority (or protected from reclamation). In one variant, the rules determine which subscribers are queried ("pinged") in order to evaluate whether delivered content is actually being utilized by these subscribers. Alternatively, selected ones of the devices are configured so as to generate an automatic response to any ping messages. In another variant, the rules for disabling bandwidth reclamation are entered via user interaction with an application running on a client device and in communication with the controller via a network proxy, or with the SDV server directly.

22 Claims, 21 Drawing Sheets

(58) Field of Classification Search
USPC .......... 725/95, 114, 116, 105; 370/230–235, 370/252, 486–487; 709/203, 226, 235
See application file for complete search history.

(56) References Cited

U.S. PATENT DOCUMENTS

| | | |
|---|---|---|
| 5,528,284 A | 6/1996 | Iwami et al. |
| 5,534,911 A | 7/1996 | Levitan |
| 5,557,319 A | 9/1996 | Gurusami et al. |
| 5,599,312 A | 2/1997 | Higashikawa |
| 5,708,961 A | 1/1998 | Hylton et al. |
| 5,745,837 A | 4/1998 | Fuhrmann |
| 5,758,257 A | 5/1998 | Herz et al. |
| 5,818,438 A | 10/1998 | Howe et al. |
| 5,822,530 A | 10/1998 | Brown |
| 5,838,921 A | 11/1998 | Speeter |
| 5,844,552 A | 12/1998 | Gaughan et al. |
| 5,897,635 A | 4/1999 | Torres et al. |
| 5,940,738 A | 8/1999 | Rao |
| 5,999,535 A | 12/1999 | Wang et al. |
| 6,118,472 A | 9/2000 | Dureau et al. |
| 6,125,397 A | 9/2000 | Yoshimura et al. |
| 6,167,432 A | 12/2000 | Jiang |
| 6,181,697 B1 | 1/2001 | Nurenberg et al. |
| 6,219,710 B1 | 4/2001 | Gray et al. |
| 6,233,389 B1 | 5/2001 | Barton et al. |
| 6,259,701 B1 | 7/2001 | Shur et al. |
| 6,317,884 B1 | 11/2001 | Eames et al. |
| 6,345,038 B1 | 2/2002 | Selinger |
| 6,389,538 B1 | 5/2002 | Gruse et al. |
| 6,396,531 B1 | 5/2002 | Gerszberg et al. |
| 6,432,401 B2 | 8/2002 | Weber et al. |
| 6,473,793 B1 | 10/2002 | Dillon et al. |
| 6,519,062 B1 | 2/2003 | Yoo |
| 6,523,696 B1 | 2/2003 | Saito et al. |
| 6,546,016 B1 | 4/2003 | Gerszberg et al. |
| 6,564,381 B1 | 5/2003 | Hodge et al. |
| 6,640,145 B2 | 10/2003 | Hoffberg et al. |
| 6,642,938 B1 | 11/2003 | Gilboy |
| 6,642,939 B1 | 11/2003 | Vallone et al. |
| 6,643,262 B1 | 11/2003 | Larsson et al. |
| 6,692,468 B1 | 2/2004 | Waldenburg |
| 6,694,145 B2 | 2/2004 | Riikonen et al. |
| 6,711,742 B1 | 3/2004 | Kishi et al. |
| 6,718,552 B1 | 4/2004 | Goode |
| 6,721,789 B1 | 4/2004 | DeMoney |
| 6,748,395 B1 | 6/2004 | Picker et al. |
| 6,754,904 B1 | 6/2004 | Cooper et al. |
| 6,757,906 B1 | 6/2004 | Look et al. |
| 6,774,926 B1 | 8/2004 | Ellis et al. |
| 6,788,676 B2 | 9/2004 | Partanen et al. |
| 6,817,987 B2 | 11/2004 | Vetter et al. |
| 6,847,778 B1 | 1/2005 | Vallone et al. |
| 6,909,726 B1 | 6/2005 | Sheeran |
| 6,918,131 B1 | 7/2005 | Rautila et al. |
| 6,925,257 B2 | 8/2005 | Yoo |
| 6,931,018 B1 | 8/2005 | Fisher |
| 6,934,964 B1 | 8/2005 | Schaffer et al. |
| 6,944,150 B1 | 9/2005 | McConnell et al. |
| 6,978,474 B1 | 12/2005 | Sheppard et al. |
| 6,981,045 B1 | 12/2005 | Brooks |
| 7,006,881 B1 | 2/2006 | Hoffberg et al. |
| 7,009,972 B2 | 3/2006 | Maher et al. |
| 7,013,290 B2 | 3/2006 | Ananian |
| 7,020,652 B2 | 3/2006 | Matz et al. |
| 7,027,460 B2 | 4/2006 | Iyer et al. |
| 7,039,048 B1 | 5/2006 | Monta et al. |
| 7,051,352 B1 | 5/2006 | Schaffer |
| 7,054,902 B2 | 5/2006 | Toporek et al. |
| 7,055,031 B2 | 5/2006 | Platt |
| 7,055,165 B2 | 5/2006 | Connelly |
| 7,068,639 B1 | 6/2006 | Varma et al. |
| 7,096,483 B2 | 8/2006 | Johnson |
| 7,099,308 B2 | 8/2006 | Merrill et al. |
| 7,100,183 B2 | 8/2006 | Kunkel et al. |
| 7,103,905 B2 | 9/2006 | Novak |
| 7,106,382 B2 | 9/2006 | Shiotsu |
| 7,146,627 B1 | 12/2006 | Ismail et al. |
| 7,149,772 B1 | 12/2006 | Kalavade |
| 7,167,895 B1 | 1/2007 | Connelly |
| 7,174,126 B2 | 2/2007 | McElhatten et al. |
| 7,174,127 B2 | 2/2007 | Otten et al. |
| 7,174,385 B2 | 2/2007 | Li |
| 7,185,355 B1 | 2/2007 | Ellis et al. |
| 7,206,775 B2 | 4/2007 | Kaiser et al. |
| 7,207,055 B1 | 4/2007 | Hendricks et al. |
| 7,209,458 B2 | 4/2007 | Ahvonen et al. |
| 7,213,036 B2 | 5/2007 | Apparao et al. |
| 7,228,556 B2 | 6/2007 | Beach et al. |
| 7,242,960 B2 | 7/2007 | Van Rooyen |
| 7,254,608 B2 | 8/2007 | Yeager et al. |
| 7,257,106 B2 | 8/2007 | Chen et al. |
| 7,260,823 B2 | 8/2007 | Schlack et al. |
| 7,293,276 B2 | 11/2007 | Phillips et al. |
| 7,312,391 B2 | 12/2007 | Kaiser et al. |
| 7,325,043 B1 | 1/2008 | Rosenberg et al. |
| 7,325,073 B2 | 1/2008 | Shao et al. |
| 7,330,483 B1 | 2/2008 | Peters et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,759 B1 | 3/2008 | Rodriguez |
| 7,340,762 B2 | 3/2008 | Kim |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,382,786 B2 | 6/2008 | Chen |
| 7,457,520 B2 | 11/2008 | Rossetti et al. |
| 7,486,869 B2 | 2/2009 | Alexander |
| 7,532,712 B2 | 5/2009 | Gonder |
| 7,548,562 B2 | 6/2009 | Ward et al. |
| 7,567,983 B2 | 7/2009 | Pickelsimer |
| 7,571,452 B2 | 8/2009 | Gutta |
| 7,592,912 B2 | 9/2009 | Hasek |
| 7,602,820 B2 | 10/2009 | Helms et al. |
| 7,609,637 B2 | 10/2009 | Doshi et al. |
| 7,624,337 B2 | 11/2009 | Sull et al. |
| 7,690,020 B2 | 3/2010 | Lebar |
| 7,693,171 B2 | 4/2010 | Gould |
| 7,721,314 B2 | 5/2010 | Sincaglia et al. |
| 7,742,074 B2 | 6/2010 | Minatogawa |
| 7,763,360 B2 | 7/2010 | Paul et al. |
| 7,787,539 B2 | 8/2010 | Chen |
| 7,809,942 B2 | 10/2010 | Baran et al. |
| 7,889,765 B2 | 2/2011 | Brooks et al. |
| 7,900,052 B2 | 3/2011 | Jonas |
| 7,916,755 B2 | 3/2011 | Hasek |
| 7,924,451 B2 | 4/2011 | Hirooka |
| 7,936,775 B2 | 5/2011 | Iwamura |
| 7,954,131 B2 | 5/2011 | Cholas et al. |
| 7,975,283 B2* | 7/2011 | Bedingfield, Sr. . H04N 7/17318 725/12 |
| 8,015,306 B2 | 9/2011 | Bowman |
| 8,032,914 B2 | 10/2011 | Rodriguez |
| 8,046,836 B2* | 10/2011 | Isokawa ................ H04L 63/145 726/23 |
| 8,056,103 B2 | 11/2011 | Candelore |
| 8,170,065 B2 | 5/2012 | Hasek |
| 8,281,352 B2 | 10/2012 | Brooks et al. |
| 8,341,242 B2 | 12/2012 | Dillon et al. |
| 8,347,341 B2 | 1/2013 | Markley et al. |
| 8,396,055 B2* | 3/2013 | Patel ...................... H04L 12/66 370/352 |
| 8,429,702 B2 | 4/2013 | Yasrebi et al. |
| 8,516,529 B2 | 8/2013 | LaJoie et al. |
| 8,520,850 B2 | 8/2013 | Helms et al. |
| 8,677,431 B2 | 3/2014 | Smith |
| 8,713,623 B2 | 4/2014 | Brooks |
| 8,731,053 B2 | 5/2014 | Karegoudar |
| 9,167,410 B1* | 10/2015 | Xue ....................... H04W 8/02 |
| 2001/0871514 | 5/2001 | Manny |
| 2001/0004768 A1 | 6/2001 | Hodge et al. |
| 2001/0050924 A1 | 12/2001 | Herrmann et al. |
| 2001/0050945 A1 | 12/2001 | Lindsey |

(56) References Cited

U.S. PATENT DOCUMENTS

| | | |
|---|---|---|
| 2002/0024943 A1 | 2/2002 | Karaul et al. |
| 2002/0026645 A1 | 2/2002 | Son et al. |
| 2002/0027883 A1 | 3/2002 | Belaiche |
| 2002/0027894 A1 | 3/2002 | Arrakoski et al. |
| 2002/0031120 A1 | 3/2002 | Rakib |
| 2002/0032754 A1 | 3/2002 | Logston et al. |
| 2002/0053076 A1 | 5/2002 | Landesmann |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0083451 A1 | 6/2002 | Gill et al. |
| 2002/0087995 A1 | 7/2002 | Pedlow |
| 2002/0100059 A1 | 7/2002 | Buehl et al. |
| 2002/0143607 A1* | 10/2002 | Connelly ............ G06Q 30/0203 705/7.32 |
| 2002/0144267 A1 | 10/2002 | Gutta et al. |
| 2002/0147771 A1 | 10/2002 | Traversat et al. |
| 2002/0152091 A1 | 10/2002 | Nagaoka |
| 2002/0188744 A1 | 12/2002 | Mani |
| 2002/0188869 A1 | 12/2002 | Patrick et al. |
| 2003/0005453 A1 | 1/2003 | Rodrigues et al. |
| 2003/0028451 A1 | 2/2003 | Ananian |
| 2003/0046704 A1 | 3/2003 | Laksono et al. |
| 2003/0056217 A1 | 3/2003 | Brooks |
| 2003/0093794 A1 | 5/2003 | Thomas et al. |
| 2003/0115267 A1 | 6/2003 | Hinton et al. |
| 2003/0118014 A1 | 6/2003 | Lyer et al. |
| 2003/0135860 A1 | 7/2003 | Dureau |
| 2003/0163443 A1 | 8/2003 | Wang |
| 2003/0165241 A1 | 9/2003 | Fransdonk |
| 2003/0166401 A1 | 9/2003 | Combes et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0019913 A1 | 1/2004 | Wong et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0049694 A1 | 3/2004 | Candelore |
| 2004/0057457 A1 | 3/2004 | Ahn et al. |
| 2004/0117254 A1 | 6/2004 | Nemirofsky |
| 2004/0133923 A1 | 7/2004 | Watson et al. |
| 2004/0137918 A1 | 7/2004 | Varonen et al. |
| 2004/0158870 A1 | 8/2004 | Paxton et al. |
| 2004/0166832 A1 | 8/2004 | Portman et al. |
| 2004/0230994 A1 | 11/2004 | Urdang et al. |
| 2004/0250273 A1 | 12/2004 | Swix et al. |
| 2005/0002418 A1 | 1/2005 | Yang et al. |
| 2005/0034171 A1 | 2/2005 | Benya |
| 2005/0047501 A1 | 3/2005 | Yoshida et al. |
| 2005/0049886 A1 | 3/2005 | Grannan et al. |
| 2005/0055220 A1 | 3/2005 | Lee et al. |
| 2005/0055729 A1 | 3/2005 | Atad et al. |
| 2005/0071882 A1 | 3/2005 | Rodriguez et al. |
| 2005/0086334 A1 | 4/2005 | Aaltonen et al. |
| 2005/0086683 A1 | 4/2005 | Meyerson et al. |
| 2005/0108763 A1 | 5/2005 | Baran et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0289618 A1 | 12/2005 | Hardin |
| 2006/0020786 A1 | 1/2006 | Helms |
| 2006/0021004 A1 | 1/2006 | Moran et al. |
| 2006/0041915 A1 | 2/2006 | Dimitrova et al. |
| 2006/0047957 A1 | 3/2006 | Helms et al. |
| 2006/0095940 A1 | 5/2006 | Yearwood |
| 2006/0104968 A1 | 5/2006 | Bookbinder et al. |
| 2006/0117379 A1 | 6/2006 | Bennett et al. |
| 2006/0130099 A1 | 6/2006 | Rooyen |
| 2006/0130101 A1 | 6/2006 | Rooyen et al. |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0136968 A1 | 6/2006 | Han et al. |
| 2006/0147471 A1 | 7/2006 | Borodic et al. |
| 2006/0149850 A1 | 7/2006 | Bowman |
| 2006/0156392 A1 | 7/2006 | Baugher |
| 2006/0161635 A1 | 7/2006 | Lamkin et al. |
| 2006/0165173 A1 | 7/2006 | Kim et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218601 A1 | 9/2006 | Michel |
| 2006/0218604 A1 | 9/2006 | Riedl et al. |
| 2006/0236358 A1 | 10/2006 | Liu et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019645 A1 | 1/2007 | Menon |
| 2007/0022459 A1 | 1/2007 | Gaebel, Jr. |
| 2007/0022469 A1 | 1/2007 | Cooper et al. |
| 2007/0025372 A1 | 2/2007 | Brenes et al. |
| 2007/0033282 A1 | 2/2007 | Mao et al. |
| 2007/0033531 A1 | 2/2007 | Marsh |
| 2007/0049245 A1 | 3/2007 | Lipman |
| 2007/0053513 A1 | 3/2007 | Hoffberg |
| 2007/0067851 A1 | 3/2007 | Fernando et al. |
| 2007/0073704 A1 | 3/2007 | Bowden et al. |
| 2007/0076728 A1 | 4/2007 | Rieger et al. |
| 2007/0094691 A1 | 4/2007 | Gazdzinski |
| 2007/0113246 A1 | 5/2007 | Xiong |
| 2007/0121578 A1 | 5/2007 | Annadata et al. |
| 2007/0121678 A1 | 5/2007 | Brooks |
| 2007/0124488 A1 | 5/2007 | Baum et al. |
| 2007/0153820 A1 | 7/2007 | Gould |
| 2007/0154041 A1 | 7/2007 | Beauchamp |
| 2007/0180230 A1 | 8/2007 | Cortez |
| 2007/0204300 A1 | 8/2007 | Markley |
| 2007/0209059 A1 | 9/2007 | Moore et al. |
| 2007/0217436 A1 | 9/2007 | Markley |
| 2007/0219910 A1 | 9/2007 | Martinez |
| 2007/0226365 A1 | 9/2007 | Hildreth et al. |
| 2007/0250880 A1 | 10/2007 | Hainline |
| 2007/0261116 A1 | 11/2007 | Prafullchandra et al. |
| 2007/0276925 A1 | 11/2007 | La Joie et al. |
| 2007/0276926 A1 | 11/2007 | LaJoie et al. |
| 2007/0294717 A1 | 12/2007 | Hill et al. |
| 2007/0294738 A1 | 12/2007 | Kuo et al. |
| 2007/0299728 A1 | 12/2007 | Nemirofsky |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092181 A1 | 4/2008 | Britt et al. |
| 2008/0098212 A1 | 4/2008 | Helms et al. |
| 2008/0098450 A1 | 4/2008 | Wu et al. |
| 2008/0101460 A1 | 5/2008 | Rodriguez |
| 2008/0103564 A1 | 5/2008 | Burkinshaw et al. |
| 2008/0112405 A1 | 5/2008 | Cholas |
| 2008/0133551 A1 | 6/2008 | Wensley et al. |
| 2008/0134165 A1 | 6/2008 | Anderson et al. |
| 2008/0137541 A1 | 6/2008 | Agarwal et al. |
| 2008/0137740 A1 | 6/2008 | Thoreau et al. |
| 2008/0155059 A1 | 6/2008 | Hardin |
| 2008/0162353 A1 | 7/2008 | Tom et al. |
| 2008/0192820 A1 | 8/2008 | Brooks et al. |
| 2008/0198780 A1* | 8/2008 | Sato .................... H04L 12/5695 370/310 |
| 2008/0201748 A1 | 8/2008 | Hasek et al. |
| 2008/0222684 A1 | 9/2008 | Mukraj et al. |
| 2008/0229379 A1 | 9/2008 | Akhter |
| 2008/0235746 A1 | 9/2008 | Peters |
| 2008/0244667 A1 | 10/2008 | Osborne |
| 2008/0273591 A1 | 11/2008 | Brooks |
| 2008/0282299 A1 | 11/2008 | Koat et al. |
| 2008/0320540 A1* | 12/2008 | Brooks ............... H04L 41/0896 725/118 |
| 2009/0025027 A1 | 1/2009 | Craner |

(56) References Cited

U.S. PATENT DOCUMENTS

| | | |
|---|---|---|
| 2009/0030802 A1 | 1/2009 | Plotnick et al. |
| 2009/0031335 A1 | 1/2009 | Hendricks et al. |
| 2009/0083279 A1 | 3/2009 | Hasek |
| 2009/0083813 A1 | 3/2009 | Dolce et al. |
| 2009/0098861 A1 | 4/2009 | Kalliola et al. |
| 2009/0100459 A1 | 4/2009 | Riedl |
| 2009/0141696 A1 | 6/2009 | Chou et al. |
| 2009/0150917 A1 | 6/2009 | Huffman et al. |
| 2009/0172776 A1 | 7/2009 | Makagon et al. |
| 2009/0185576 A1 | 7/2009 | Kisel et al. |
| 2009/0187939 A1 | 7/2009 | Lajoie |
| 2009/0193486 A1 | 7/2009 | Patel et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas |
| 2009/0225760 A1 | 9/2009 | Foti |
| 2009/0282241 A1 | 11/2009 | Prafullchandra et al. |
| 2009/0293101 A1 | 11/2009 | Carter et al. |
| 2010/0027560 A1 | 2/2010 | Yang et al. |
| 2010/0030578 A1 | 2/2010 | Siddique et al. |
| 2010/0042478 A1 | 2/2010 | Reisman |
| 2010/0043030 A1 | 2/2010 | White |
| 2010/0083329 A1 | 4/2010 | Joyce et al. |
| 2010/0086020 A1* | 4/2010 | Schlack .............. H04L 67/322 375/240.01 |
| 2010/0106846 A1 | 4/2010 | Noldus et al. |
| 2010/0115091 A1 | 5/2010 | Park et al. |
| 2010/0122274 A1 | 5/2010 | Gillies |
| 2010/0125658 A1 | 5/2010 | Strasters |
| 2010/0131973 A1 | 5/2010 | Dillon et al. |
| 2010/0135646 A1 | 6/2010 | Bang et al. |
| 2010/0138900 A1 | 6/2010 | Peterka et al. |
| 2010/0169977 A1 | 7/2010 | Dasher et al. |
| 2010/0217613 A1 | 8/2010 | Kelly et al. |
| 2010/0228121 A1 | 9/2010 | Kazuhiro et al. |
| 2010/0251304 A1 | 9/2010 | Donoghue |
| 2010/0251305 A1 | 9/2010 | Kimble |
| 2010/0269144 A1 | 10/2010 | Forsman et al. |
| 2010/0287609 A1 | 11/2010 | Gonzalez et al. |
| 2010/0313225 A1 | 12/2010 | Cholas et al. |
| 2010/0325547 A1 | 12/2010 | Keng et al. |
| 2011/0071841 A1 | 3/2011 | Fomenko et al. |
| 2011/0078731 A1 | 3/2011 | Nishimura |
| 2011/0090898 A1* | 4/2011 | Patel .................. H04L 12/66 370/352 |
| 2011/0093900 A1 | 4/2011 | Patel |
| 2011/0103374 A1 | 5/2011 | Lajoie et al. |
| 2011/0126244 A1 | 5/2011 | Hasek |
| 2011/0145049 A1 | 6/2011 | Hertel et al. |
| 2011/0173053 A1 | 7/2011 | Aaltonen |
| 2011/0173095 A1 | 7/2011 | Kassaei |
| 2011/0213688 A1 | 9/2011 | Santos et al. |
| 2011/0219229 A1 | 9/2011 | Cholas et al. |
| 2011/0219411 A1 | 9/2011 | Smith |
| 2011/0276881 A1 | 11/2011 | Keng et al. |
| 2011/0277008 A1* | 11/2011 | Smith .................. H04N 21/2385 725/116 |
| 2012/0008786 A1 | 1/2012 | Cronk et al. |
| 2012/0011567 A1 | 1/2012 | Cronk et al. |
| 2013/0097647 A1 | 4/2013 | Brooks et al. |
| 2013/0117692 A1 | 5/2013 | Padmanabhan et al. |
| 2014/0074855 A1 | 3/2014 | Zhao et al. |
| 2014/0201799 A1 | 7/2014 | Smith |

FOREIGN PATENT DOCUMENTS

| | | |
|---|---|---|
| JP | A-2005-339093 | 12/2005 |
| JP | A-2008-015936 | 1/2008 |
| JP | A-2009-211632 | 9/2009 |
| JP | A-2010-502109 | 1/2010 |
| JP | A-2010-079902 | 4/2010 |
| JP | A-2012-523614 | 10/2010 |
| JP | A-2012-505436 | 3/2012 |
| WO | WO 01/10125 | 2/2001 |
| WO | WO 01/39505 | 5/2001 |
| WO | WO 2005/015422 | 2/2005 |
| WO | WO 2005/031524 | 4/2005 |
| WO | WO 2007/060451 | 5/2007 |
| WO | WO 2012/021245 | 2/2012 |

OTHER PUBLICATIONS

DOCSIS® 3.0 Management Features Differences Technical Report CM-TR-MGMTv3.0-DIFF-V01-071228, pp. 1-62.

DOCSIS 3.0 OSSI Configuration Management Technical Report CM-TR,OSSIv3.0-CM-V01-080936. pp. 1-84.

DLNA Interoperability Guidelines. version 1.5, Mar. 2006, pp. 1-23.

OpenCable Specifications—Tuning Resolver Interface Specification—OS-SP-TRIF-I01-080130. Jan. 30, 2008, pp. 1-50.

UTF-32 IBM retrieved from http://publib.boulder.ibm.com/infocenter/iseries/v5r3/index.jsp?topic=%Fnls%2Frbagsutf32.htm. on Aug. 28, 2013.

Security Assertion Markup language (SAML) Specification (Version 2.0 released in 2005) as SAML Core: S. Cantor et al. Assertions and Protocols for the OASIS Security Assertion Markup Language (SAML) V2.0. OASIS Standard Mar. 2005. Document ID saml-core-2.0-os (http://docs.oasis-open.org/security/saml/v2.0/saml-core-2.0-os.pdf).

SAML Binding: S. Cantor et al. Bindings for the OASIS Security Assertion Markup Language (SAML) V2.0. OASIS Standard Mar. 2005. Document ID saml-bindings-2.0-os (http://docs.oasis-open.org/security/saml/v2.0/saml-bindings-2.0-os.pdf).

"Select a Channel to start watching", Videophiles: Curate your own online video channel with expressive, easy to use tools; © 2014 Redux, Inc. All rights reserved; http://www.redux.com/; 2 pages.

* cited by examiner

SdvSm.OFFERED Progs BASE — 1100

| PROGRAM | SOURCE ID | Admin STATE | NAME | OFFER STATE |
|---|---|---|---|---|
| 1 | 7515 | IN SERVICE | 5 STAR MAX SDV | DYNAMIC / STATIC / DYNAMIC |
| 2 | 7643 | IN SERVICE | THE N SDV 143 | |

HEADEND - LINEUP — 1200

| CHANNEL CALL SIGN | PRIMARY SOURCE IP | SECONDARY SOURCE IP | MULTICAST GROUP | SOURCE UDP PORT | BIT RATE | DEFINI... | AGING TIMEOUT(M... | Admin STATUS | |
|---|---|---|---|---|---|---|---|---|---|
| E | 172.16.15.38 | 172.16.15.6 | 239.192.1.1 | 3301 | 3.7500 | SD | DISABLED | DYNAMIC | SET AS DYNAMIC |
| | 172.16.15.38 | 172.16.15.6 | 239.192.1.2 | 3302 | 3.7500 | SD | DISABLED | DYNAMIC | DISABLE SERVICE |
| | 172.16.15.38 | 172.16.15.6 | 239.192.1.3 | 3303 | 3.7500 | SD | DISABLED | DYNAMIC | DELETE SERVICE Ctrl+Del |
| | 172.16.15.38 | 172.16.15.6 | 239.192.1.4 | 3304 | 3.7500 | SD | DISABLED | DYNAMIC | REFRESH F5 |
| | 172.16.15.38 | 172.16.15.6 | 239.192.1.5 | 3305 | 3.7500 | SD | DISABLED | DYNAMIC | |
| | 172.16.15.38 | 172.16.15.6 | 239.192.1.6 | 3306 | 3.7500 | SD | DISABLED | DYNAMIC | |

SECURITY MODE LIST — 1300

FILE  VIEW                                      HELP

SOURCE NAME:  5 STAR MAX

| EFFECTIVE DATE | EFFECTIVE TIME | SECURITY MODE |
|---|---|---|
| 12/09/2004 | 05:16:27 PM | ENCRYPTED |

SET UP SECURITY MODE

SOURCE NAME:  5 STAR MAX

SECURITY MODE:  ○ CLEAR   ○ ENCRYPED

DATE/TIME:  ○ NOW   ○ CUSTOM

EFFECTIVE DATE:  MM/DD/YYYY

EFFECTIVE TIME:  HH:MM:SS   AM —

[ SAVE ]   [ CANCEL ]   [ HELP ]

*FIG. 13*

APPARATUS AND METHODS FOR CONTROLLED BANDWIDTH RECLAMATION

RELATED APPLICATIONS

This application is related to co-owned U.S. application Ser. No. 12/775,034 filed on May 6, 2010, issued as U.S. Pat. No. 8,677,431 on Mar. 18, 2014, and entitled "TECHNIQUE FOR PROVIDING UNINTERRUPTED SWITCHED DIGITAL VIDEO SERVICE", and co-owned U.S. application Ser. No. 12/841,906 filed on Jul. 22, 2010, issued as U.S. Pat. No. 8,997,136 on Mar. 31, 2015, and entitled "APPARATUS AND METHODS FOR PACKETIZED CONTENT DELIVERY OVER A BANDWIDTH-EFFICIENT NETWORK", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of data transmission. In one exemplary aspect, the invention relates to the use of an interactive application for enabling a user to interact with and adjust the reclamation of bandwidth in a bandwidth constrained content and data distribution (e.g., cable) network.

2. Description of Related Technology

The provision of content to a plurality of subscribers in a content-based network is well known in the prior art. In a typical configuration, the content is distributed to the subscribers devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery services are utilized in providing content to subscribers. For example, certain content may be provided according to a broadcast schedule (aka "linear" content). Content may also be provided on-demand (such as via video on-demand or VOD, free video on-demand, near video on-demand, etc.). Content may also be provided to users from a recording device located at a user premises (such as via a DVR) or elsewhere (such as via a personal video recorder or network personal video recorder disposed at a network location) or via a "startover" paradigm, which also affords the user increased control over the playback of the content ("non-linear").

Current carrier class stream delivery mechanisms require mechanisms for conserving and/or efficiently using bandwidth. For example, Broadcast Switched Architecture (BSA; also commonly known as "switched digital video" or "SDV") content delivery networks, such as that described in co-assigned application Ser. No. 09/956,688, filed Sep. 20, 2001, issued as U.S. Pat. No. 8,713,623 on Apr. 29, 2014, and entitled "TECHNIQUE FOR EFFECTIVELY PROVIDING PROGRAM MATERIAL IN A CABLE TELEVISION SYSTEM", incorporated herein by reference in its entirety, may be utilized to selectively deliver only a subset of available programming to network subscribers in order to optimize bandwidth. Delivery of programming under this mechanism is typically based on customer requests (or lack thereof) for programming; however, bandwidth consumption may vary greatly during the day. In a fixed bandwidth model, the BSA architecture delivers a fixed amount of programming based on the fixed bandwidth constraint; the programming actually delivered at any given time will be only a fraction of the total of the programming available to the user base.

In the BSA or SDV model, content which is no longer being viewed or utilized by subscribers is switched out of delivery in favor of new requests. In many instances, the determination of which content may be switched out is made by sending so-called "pings" to the subscribers receiving content which may no longer be utilizing that content. The set of subscribers to ping may be determined based on the amount of time elapsed since a last button press, or may be determined based on a sensed physical presence of a viewer/user. If a subscriber does not respond to a ping, content delivery is ceased, and the bandwidth is reclaimed for the provision of content for subsequent requests.

Failure to respond to ping messages (and/or lack of physical presence of a viewer/user at the display device) may not necessarily indicate the desirability for carrier reclamation. In some instances, the previously requested (old) content should still be provided to these devices. For example, a subscriber may tune to a content channel providing music content for an extended period of time, continuing to utilize the content (i.e., listen to the music) although he/she is not physically present at the device. If the content is selected for bandwidth reclamation the user may not be nearby to respond to a ping, and the content delivery may be torn down and the carrier(s) reclaimed, an undesired effect. Other examples and instances where bandwidth reclamation is undesirable include without limitation the case where a user is tuned to a channel for purposes of recording the delivered program stream, but is not physically present (e.g., remote-initiated recording, or recording while the user is away at work).

Accordingly, what are needed are apparatus and methods for disabling reclamation features for specific content, carriers, devices, use contexts, and/or users, thereby ensuring uninterrupted delivery of requested content thereto. Ideally, such apparatus and methods would be configured to provide a network operator and/or a user or subscriber the ability to disable reclamation.

SUMMARY OF THE INVENTION

The present invention addresses the foregoing needs by disclosing apparatus and methods for content management and controlled bandwidth reclamation.

In a first aspect of the invention, a method of providing content in content delivery network is disclosed. In one embodiment, the network is bandwidth-constrained, and comprises a plurality of devices arranged in service groups. The method comprises: delivering a plurality of streams comprising a respective plurality of content to a first service group; receiving a request for content from a first device within the first service group, the requested content not being within the plurality of content delivered to the service group; determining that delivery of the requested content would exceed available bandwidth limits; identifying one or more of the plurality of delivered content to be removed from delivery, the identification utilizing one or more rules for exempting reclamation of certain content streams; reclaiming at least one of the identified one or more of the plurality of delivered content; and providing delivery of the requested content in place of the identified and reclaimed one or more streams.

In one variant, the identification utilizing the one or more rules comprises identifying only content which is not exempted.

In another variant, the identification comprises: identifying one or more exempt devices based on the one or more rules; providing a trigger to the one or more exempt devices; and sending a message requiring a response to individual ones of the devices which have not had any interaction with the one or more of the plurality of content within a given time period, the trigger causing the one or more exempt devices to automatically respond to the message.

In yet another variant, the identification comprises: identifying one or more exempt devices based on the one or more rules; and sending a message requiring a response to individual ones of the device which have not had any interaction with the one or more of the plurality of content within a given time period, the message not being sent to the one or more exempt devices.

In a second aspect of the invention, a control apparatus configured to control the delivery of content to a plurality of devices over a network is disclosed. In one embodiment, the apparatus comprises: at least one interface for communication within the network; a storage apparatus; and a digital processor, the processor configured to run at least one computer application thereon. The application is configured to, when executed: receive a request for content not currently being delivered, determine that sufficient bandwidth to fill the request is not available; identify one or more content streams being delivered to at least one of the devices, but not currently being utilized by the at least one device; exempt from the identified one or more content streams those streams being delivered to exempted ones of the devices, the exempted ones being determined based at least in part on one or more exemption rules; and reclaim bandwidth associated with the identified and not exempted ones of the one or more content streams for delivery of the requested content not currently being delivered.

In one variant, the delivery of content to a plurality of devices over a network utilizes comprises a switched digital video server delivering content to a plurality of devices in a service group.

In another variant, the rules are obtained via the interface from one of the plurality of devices, and the rules identify the one of the plurality of devices as exempt from the bandwidth reclamation measures.

In yet another variant, the identification comprises: sending a ping signal to individual ones of the plurality of devices for which interaction with content delivered thereto has not been detected in a predetermined amount of time; causing the exempted ones of the individual ones of the plurality of devices to automatically respond to the ping signal; and requiring a user response to the ping signal from the ones of the individual ones of the plurality of devices which are not exempt.

In a third aspect of the invention, a proxy apparatus is disclosed. In one embodiment, the apparatus is useful for communication between a video server controller and a plurality of client devices of a content delivery network, and comprises: a first interface for communication with the server controller; a second interface for communication with the plurality of client devices; a storage apparatus; and a processor configured to run at least one computer application thereon. The application is configured to, when executed: receive first data signals from an application running on one of the plurality of client devices, the data signals providing one or more bandwidth reclamation rules; convert the first data signals to a format compatible with the server controller; transmit the converted first data signals to the SDV controller apparatus; receive second data signals from the server controller, convert the second data signals to a format compatible with the application running on the one of the plurality of client devices; and transmit the converted second data signals to the one of the plurality of client devices.

In one variant, the application running on the one of the plurality of client devices comprises an Enhanced TV Binary Interchange Format (EBIF) application, the server controller apparatus utilizes an Extensible Markup Language (XML) format, and the conversion of the first and the second data signals comprises conversion between the EBIF format and the XML format.

In another variant, the second data signals comprise: a signal causing the application running on the one of the plurality of client devices to download a software application for automatically responding to ping messages; and a ping message.

In a fourth aspect of the invention, a consumer device is disclosed. In one embodiment, the device is for use in a bandwidth-efficient content distribution network, and comprises: at least one interface for communication with the network; a storage apparatus; and a digital processor configured to run at least one computer program thereon. The computer program when executed: enables a user of the consumer device to generate an indicator, the indicator indicating that particular content received at the device and/or the device itself is exempt from bandwidth efficiency measures implemented by the network; and transmits the indicator to one or more network entities.

In one variant, the computer program when executed further: receives from the one or more network entities a signal to download an automatic response application, the automatic response application configured to automatically respond to messages requiring a user response; and causes the automatic response application to run on the consumer device.

In another variant, the computer program when executed further: receives a message requiring a user response; and in response to receipt of the message utilizes the automatic response application to automatically respond to the message.

In a fifth aspect of the invention, a method for enabling user interaction with bandwidth conservation mechanisms in a content delivery network is disclosed. In one embodiment, the method comprises: providing an Enhanced TV Binary Interchange Format (EBIF) application to a user device; enabling the user to interact with the EBIF application to assign priority to delivery of content to the user device; and receiving the priority assignment at a network entity configured to utilize the priority assignment in determining one or more delivered content streams to reclaim for provision of previously undelivered content. The utilization of the priority assignment comprises ensuring delivery of content streams to the user device are not reclaimed.

In one variant, the utilization of the priority assignment comprises at least one of: omitting to send pinging messages to the user device; and providing to the user device a software application configured to automatically respond to the pinging messages.

In a sixth aspect of the invention, a computer-readable apparatus is disclosed. In one embodiment, the apparatus comprises a storage medium with a computer program disposed thereon, the program when executed which: enables a user of the consumer device to generate an indicator, the indicator indicating that particular content received at the device and/or the device itself is exempt from bandwidth efficiency measures implemented by the network; and transmits the indicator to one or more network entities.

In a seventh aspect of the invention, a system for implementing control of bandwidth reclamation within a managed content delivery network is disclosed.

These and other aspects of the invention shall become apparent when considered in light of the disclosure provided herein.

BRIEF DESCRIPTION OF THE DRAWINGS

FIG. 11 is a functional block diagram illustrating an exemplary interface for selecting an offer state for each program via a Universal Session and Resource Manager (USRM).

FIG. 12 is a functional block diagram illustrating an exemplary interface for selecting an administrative state for each device serviced by a switched digital video (SDV) server.

FIG. 13 is a functional block diagram illustrating an exemplary interface for enabling a network operator to enter program details for a preferred program.

Figure 1:
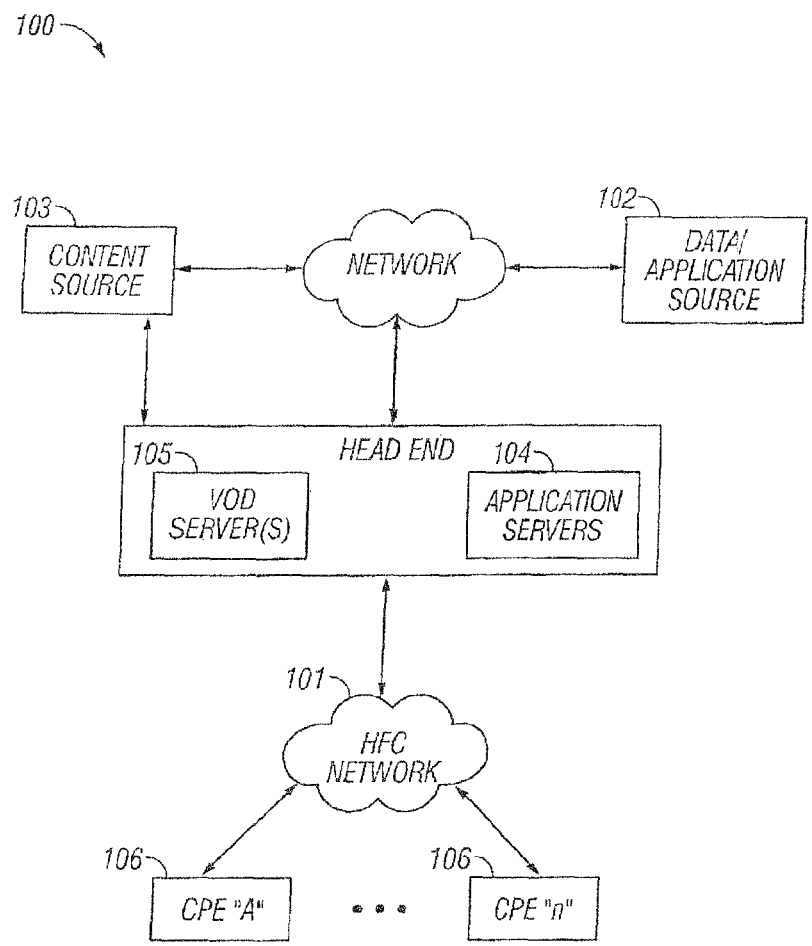
FIG. 1 is a functional block diagram illustrating an exemplary hybrid fiber network configuration useful with the present invention.

All Figures © Copyright 2010-2011 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANS, WANs, LANs, WLANs, interacts, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including e.g., 802.11a/b/g/i/n/v/z.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one salient aspect, the present invention discloses methods and apparatus for providing network operator or subscriber (user) with the ability to disable reclamation in a switched digital video (SDV) content delivery network. In one embodiment, a network entity for controlling and directing bandwidth reclamation operations is disclosed. The controller entity may be pre-programmed with one or more rules, and/or be responsive to network operator and/or user inputs, to determine whether to reclaim bandwidth in various operational scenarios. The rules/inputs designate certain carriers or streams, content, devices and/or subscribers as "high priority", and exempt them from bandwidth reclamation.

In one implementation, the controller entity controls bandwidth reclamation by, e.g., using the aforementioned rules and/or inputs to determine which of a plurality of subscribers receiving content to "ping" in order to determine whether these subscribers are viewing/utilizing content delivered thereto.

In another variant, rather than selective pinging, the controller may elect instead to provide the selected ones of the devices (i.e., those devices receiving selected content, those associated with specific subscribers, etc.) with a message or signal which triggers an automatic response to any ping messages. In this instance, a ping message may then be sent to a larger group of subscribers without regard to a priority of each. The exempted devices are triggered to automatically respond to the message without user intervention.

In another embodiment, rules for disabling bandwidth reclamation may be entered or modified via user interaction with an application running on a client device. The client application transmits commands, including commands to disable reclamation, via a network proxy to the controller entity. In one variant, the client application comprises an Enhanced TV Binary Interchange Format (EBIF) application, and the network proxy is charged with transcoding between the EBIF application format and a format used by the controller entity.

In yet another embodiment, the subscriber or user may interact directly with a server for delivery of content (such as an SDV server) via an overlay provided in the delivery of content thereto.

The rules for disabling bandwidth reclamation may relate to any number of different factors or considerations, including without limitation: (i) a particular content being provided, (ii) the device(s) receiving the content, (iii) the subscriber(s) receiving the content, and/or (iv) the particular carrier on which content is delivered.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while exemplary embodiments are described primarily in the context of a cable system with 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. As will be discussed in greater detail below, in one embodiment the CPE may include IP-enabled CPE 107 (although not illustrated in FIGS. 1-1*d*), and a gateway or specially configured modem (e.g., DOCSIS cable modem).

Although not illustrated, a typical network headend 150 may further include e.g., various billing entities, subscriber management systems, cable modem termination system (CMTS)

It will also be appreciated that the network configuration depicted in FIG. 1 is high-level, conceptual architecture and that each MSO may have multiple headends deployed using custom architectures.

Figure 1A:
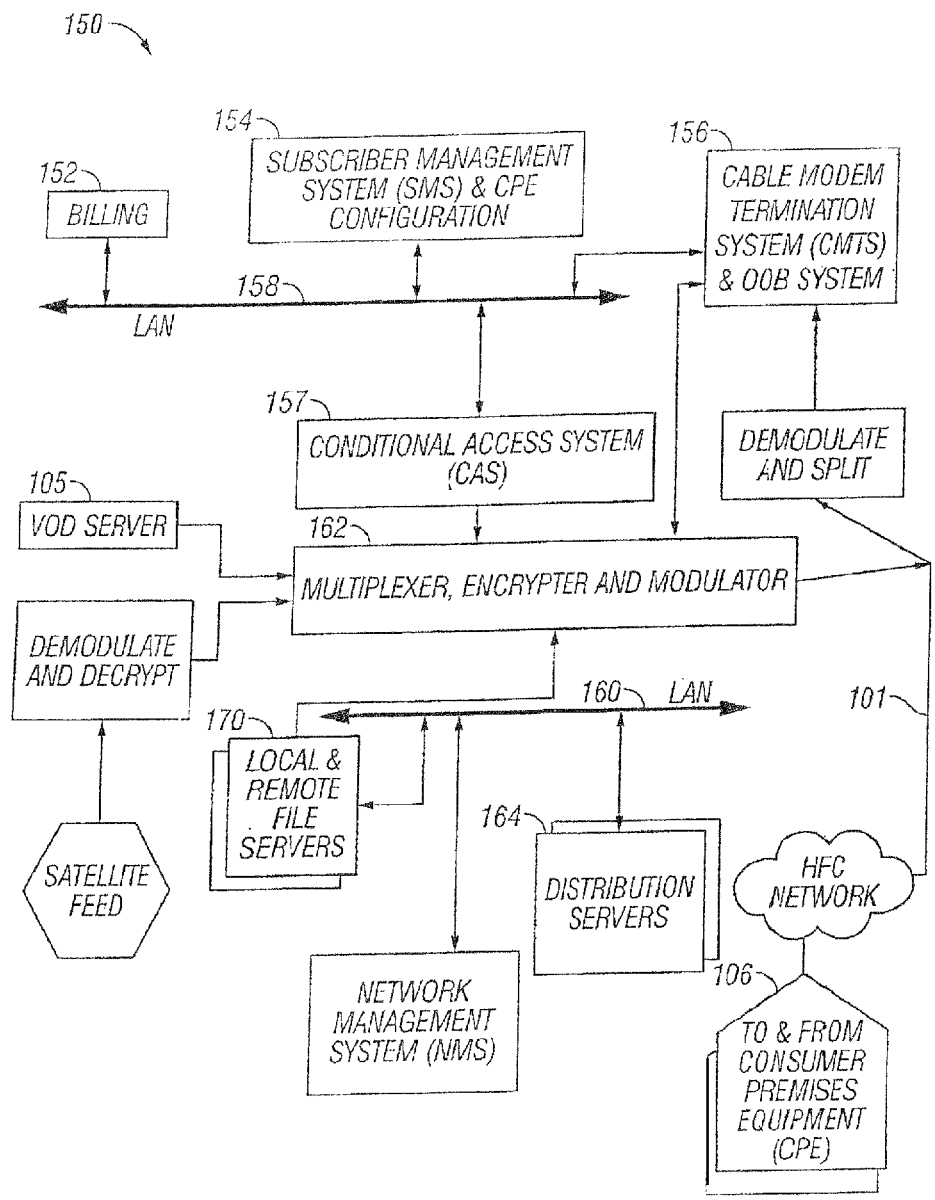
FIG. 1a is a functional block diagram illustrating one exemplary network headend configuration useful with the present invention.

Referring now to FIG. 1*a*, one exemplary embodiment of a headend architecture useful with the present invention is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1*a* is high-level, conceptual architecture and that each MSO may have multiple headends deployed using custom architectures.

Figure 1B:
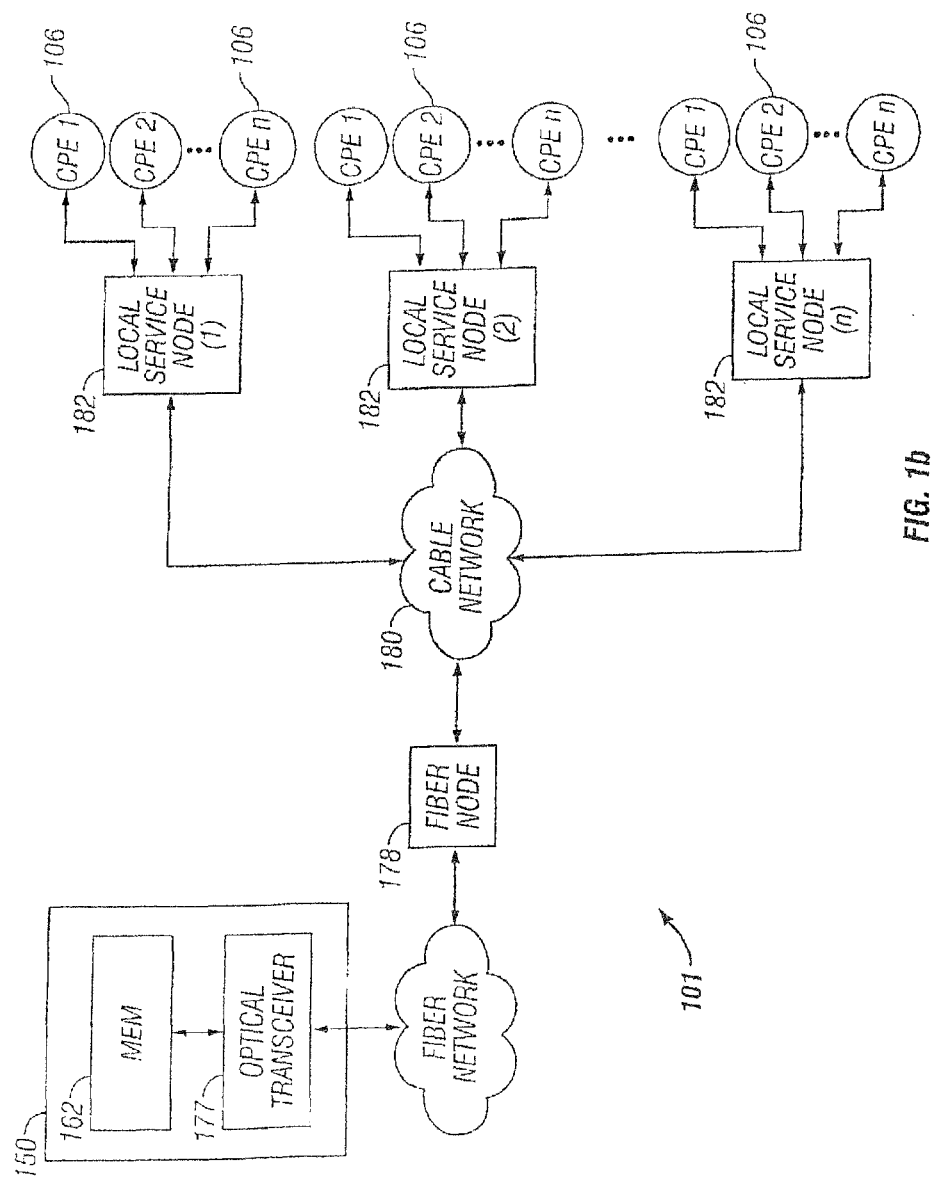
FIG. 1b is a functional block diagram illustrating one exemplary local service node configuration useful with the present invention.

The exemplary architecture 150 of FIG. 1*a* further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1*b*) via a variety of interposed network components.

It will also be recognized, however, that the multiplexing operation(s) need not necessarily occur at the headend 150 (e.g., in the aforementioned MEM 162). For example, in one variant, at least a portion of the multiplexing is conducted at a broadcast switched architecture (BSA; also commonly known as "switched digital video" or "SDV") switching node or hub (see discussion of FIG. 1*d* provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

An optical transport ring (not shown) is also commonly utilized to distribute the dense wave-division multiplexed (DWDM) optical signals to each hub within the network in an efficient fashion.

In addition to on-demand and broadcast content (e.g., video programming), the system of FIGS. 1 and 1*a* (and 1*c* and 1*d* discussed below) also deliver Internet 111 data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs, such as described below with respect to FIG. 1*d*.

The CPE 106 are each configured to monitor the particular assigned RF channel (such as via a port or socket ID/address, or other such mechanism) for IP packets intended for the subscriber premises/address that they serve.

"Switched" Networks

Figure 1C:
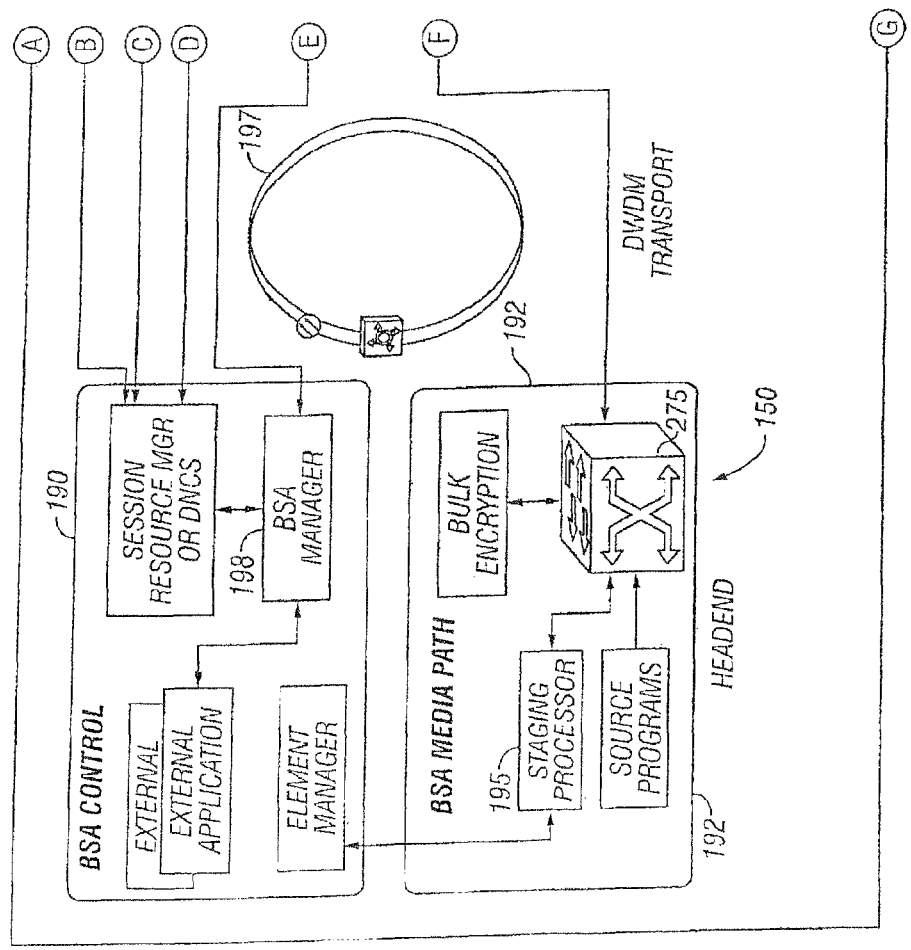
FIG. 1c is a functional block diagram illustrating one exemplary broadcast switched architecture (BSA) network useful with the present invention.
Figure 1C:
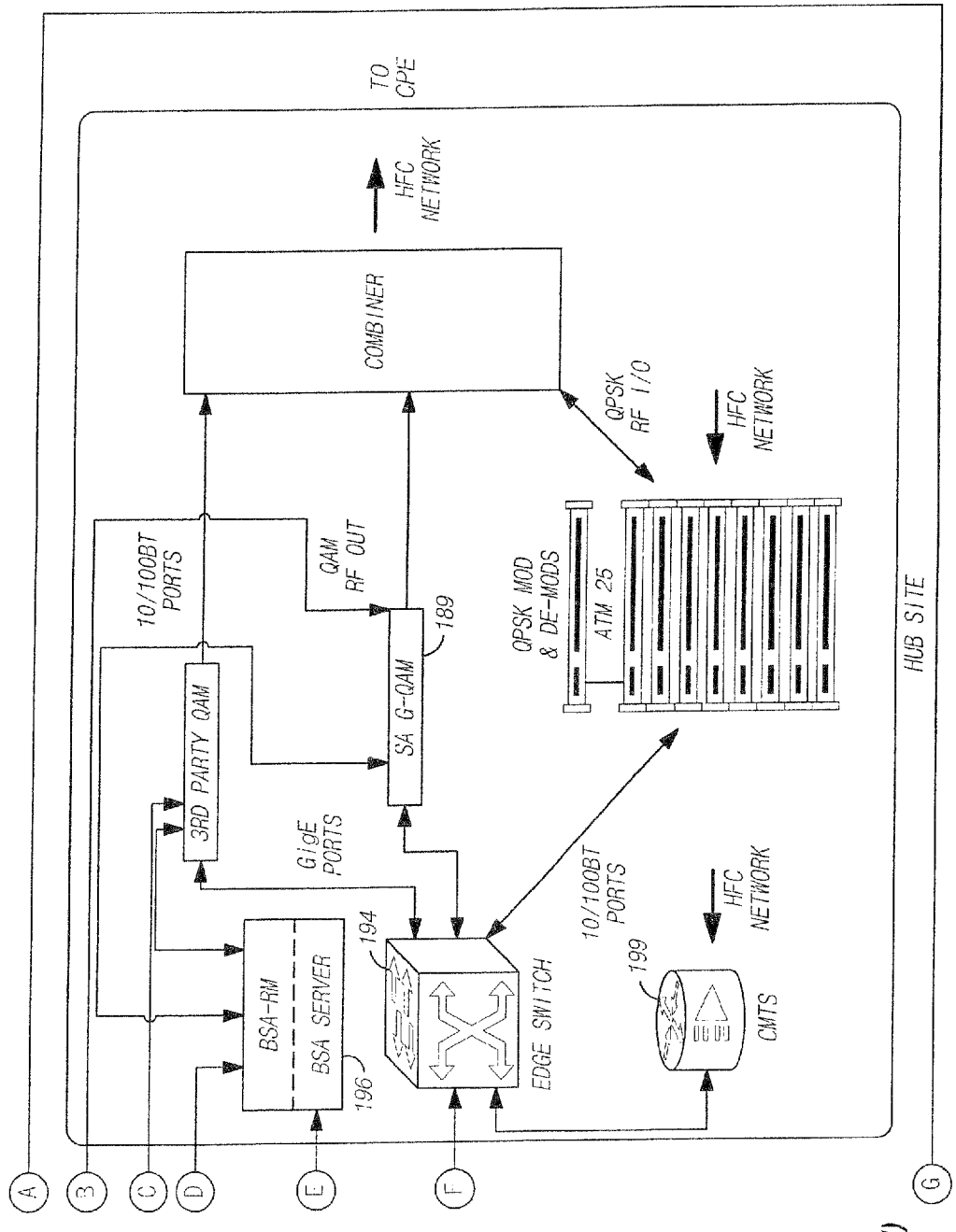
Figure 1D:
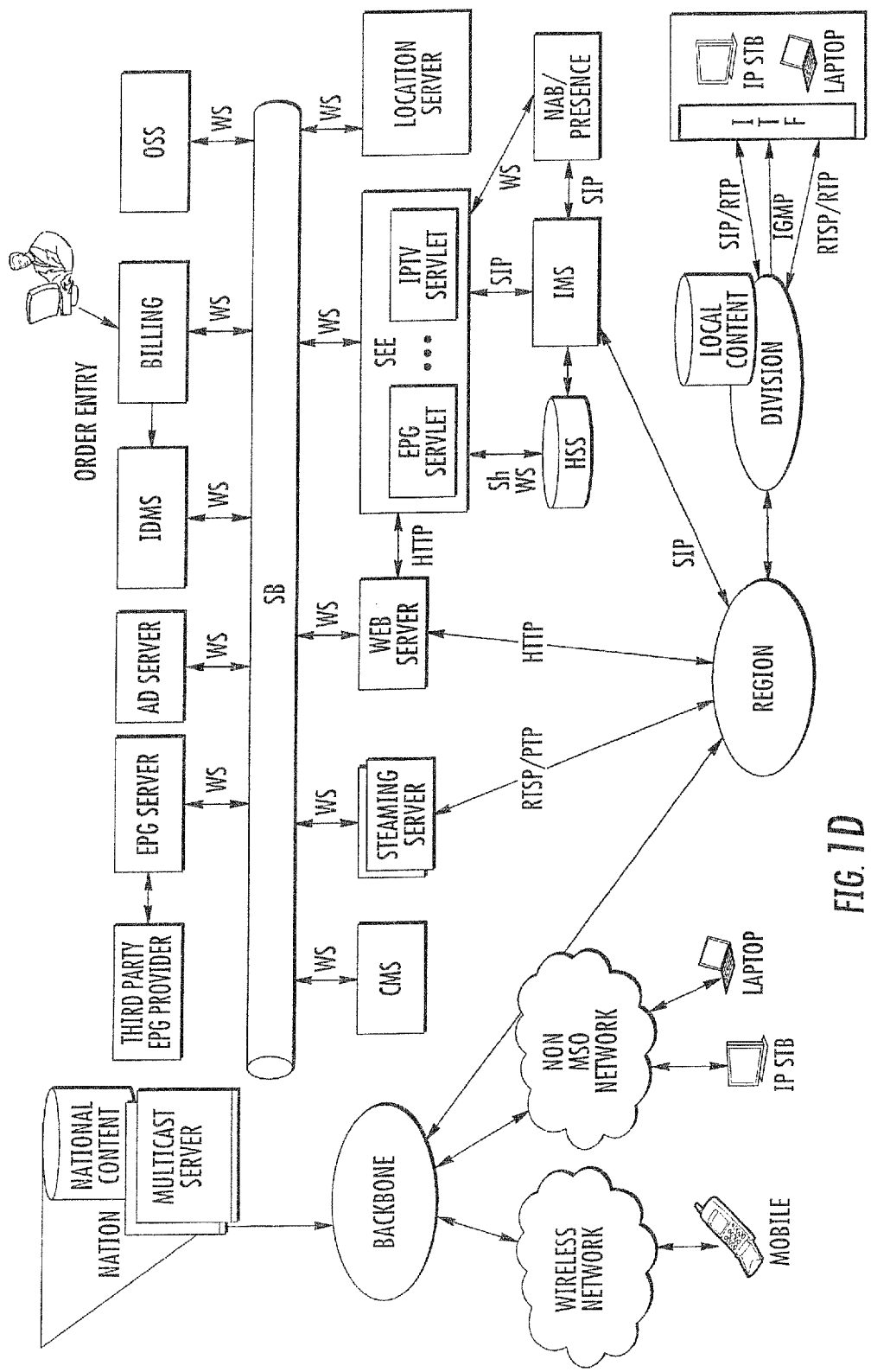
FIG. 1d is a functional block diagram illustrating one exemplary packetized content delivery network architecture useful with the present invention.

FIG. 1*c* illustrates an exemplary "switched" network architecture also useful with the present invention. While a so-called "broadcast switched architecture" (BSA), also known as "switched digital video" or "SDV", network is illustrated in this exemplary embodiment for performing bandwidth optimization/conservation functions, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192, these element cooperating to control and feed, respectively, downstream or edge switching devices 194 at the hub site which are used to selectively switch broadcast streams to various service groups. A BSA or SDV server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

As previously referenced, U.S. patent application Ser. No. 09/956,688 entitled "TECHNIQUE FOR EFFECTIVELY PROVIDING PROGRAM MATERIAL IN A CABLE TELEVISION SYSTEM" (published as U.S. Patent Publication No. 2003/0056217) describes one exemplary broadcast switched digital architecture useful with the present invention, although it will be recognized by those of ordinary skill that other approaches and architectures may be substituted.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content) when the request issues from an MSO network (see discussion of FIG. 2a below). FIG. 1c illustrates one exemplary implementation of such a network, in the context of an IMS (IP Multimedia Subsystem) network with common control plane and service delivery platform (SDP), as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, quality-of-service (QoS) for IP-packetized content streams, service blending and "mashup", etc.; however, it is appreciated that the various features of the present invention are in no way limited to any of the foregoing architectures.

Network-Controlled Content Delivery Network Architecture—

Figure 2:
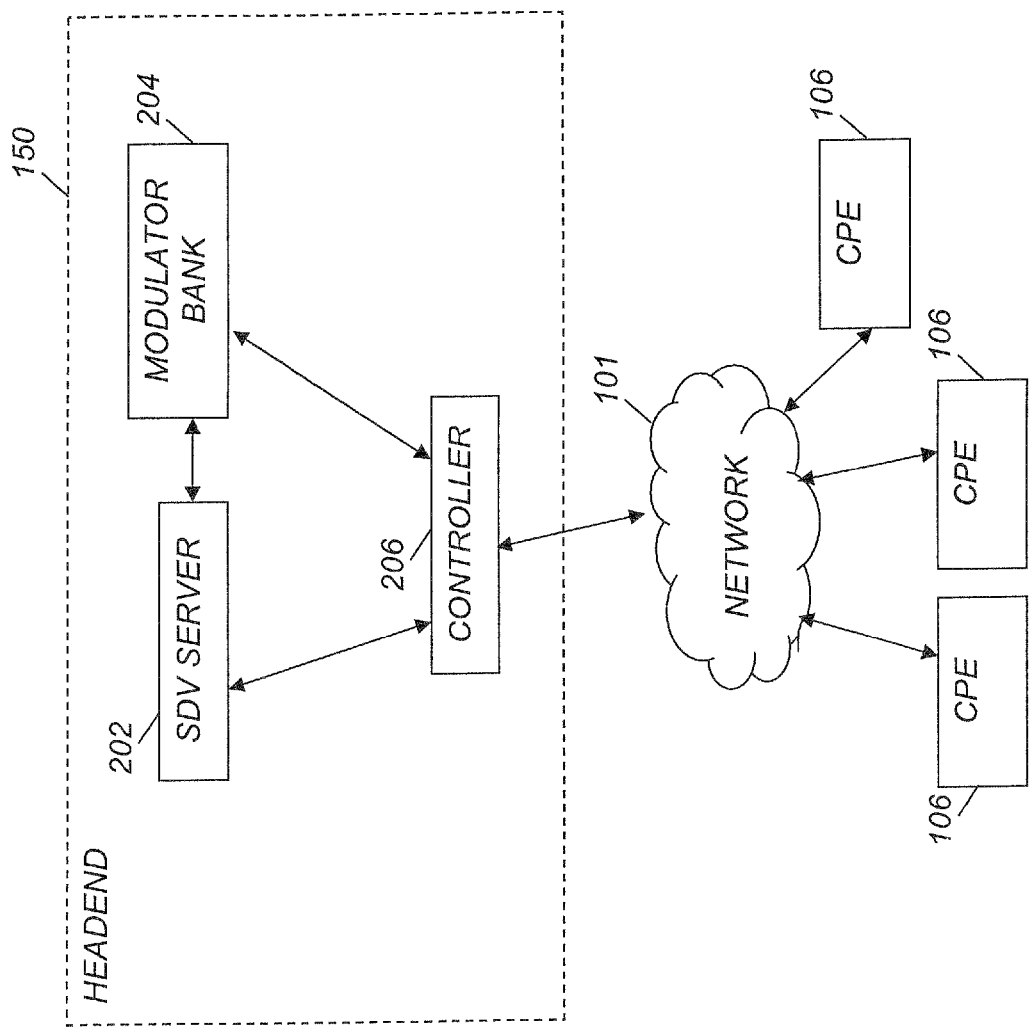
FIG. 2 is a functional block diagram illustrating a content delivery network architecture for providing network-controlled reclamation in accordance with one embodiment of the present invention.

Referring now to FIG. 2, an exemplary architecture for providing adjustable content delivery according to the present invention is illustrated. The system of FIG. 2 generally comprises a network headend 150 comprising, inter alia, a switched digital video (SDV) or BSA server 202, a modulator bank 204, and a controller entity 206. The headend 150 communicates with and delivers content to a plurality of consumer devices (such as consumer premises equipment (CPE) 106) via a network 101.

Program materials are made available to subscribers in a neighborhood or service group on an as-needed basis. That is to say, when a subscriber at a CPE 106 selects a program channel, the selection request is transmitted to the headend 150. The controller 206 determines whether the requested program is currently being made available in the neighborhood/service group which contains the requesting subscriber.

In one embodiment, the dynamic assignment of carriers is monitored, and the aforementioned determination is facilitated via use of an assignment table. The assignment table (not shown) may utilize a series of organized records indicating a current carrier assigned to each program channel. In the event the program channel is not currently being provided, a null record may be stored. Still further, the assignment table provides a means for determining a number of subscribers which are tuned to the provided carrier. This information is collected, dynamically updated, and utilized in providing requested content as discussed herein.

If requested material is currently being provided, the controller 206 notifies the CPE 106 of the carrier which is currently carrying the requested program. If the material is not currently being provided, the controller 206 assigns an unused carrier to carry the requested program material, and informs the CPE 106 of the newly assigned carrier such as via a separate carrier or as out of band data.

The BSA or SDV switching server 202 is controlled by the controller 206, and performs the selection and switching of the requested program channel onto the controller-designated carrier from the modulator bank 204. Each selected program data stream is transmitted through a different transmission channel after modulation of a carrier associated with the transmission channel in a designated forward passband. In other words, the controller 206 causes the SDV server 202 to switch, to modulator bank 204, the selected program data streams which contain the requested program material. In one embodiment, the controller 206 may further specify to the SDV server 202 the selected input of the modulator bank 204 to which the selected data stream should be switched.

A combiner (not shown) is utilized to combine the data signals of the requested program with a control signal to form a combined signal for transmission to an optical transceiver. The optical transceiver (not shown) generates an optical signal which is provided to a fiber node, converted to electrical form, and provided via a multicast to the CPE 106.

The CPE 106 tunes to the control carrier frequency, and extracts the control signal which contains information identifying a carrier which is assigned to carry the requested program channel. Using this information, the CPE 106 tunes to the frequency of the identified carrier and extracts the data signal for viewing.

In the instance that no carriers are available to provide the requested content, the controller 206 may reclaim carriers assigned to program channels which are no longer being utilized by subscribers in the service group. The controller 206 may then use the reclaimed carriers to provide newly requested programming content. Various logical rules and/or inputs control the carrier reclamation, as will be discussed in greater detail subsequently herein.

As described in previously incorporated co-owned, co-pending U.S. patent application Ser. No. 12/775,034 filed on May 6, 2010, issued as U.S. Pat. No. 8,677,431 on Mar. 18, 2014, and entitled "TECHNIQUE FOR PROVIDING UNINTERRUPTED SWITCHED DIGITAL VIDEO SERVICE", the determination of whether any subscribers viewing programming provided by a particular carrier may be implemented via a response request message sent to the subscribers (a so-called "ping"), although other mechanisms may be used as well. The controller 206 can use information collected after the pinging to determine which carriers may be reclaimed. Alternative methods for determining whether a subscriber is viewing content may also be used, such as e.g., physical detection of the viewer's presence using sensors, periodic evaluation of tuning activity, and the like.

In one embodiment, the ping message comprises a message requiring user response. According to this embodiment, if no function selection, button presses, or other interaction with content or rendering device have been detected within a predetermined period, a message appears on the rendering device (e.g., TV monitor) requesting user interaction or acknowledgement. The message may be placed in a separate display window, on top of the currently provided program (overlaid) or, alternatively, the screen may be blanked and the message presented. The message may ask the viewer, for example, whether he/she is still interested in viewing the present program, or may simply require an interaction (e.g., "press any button"). If a response (or affirmative response) is received from the user, the system will not, subject to certain other rules and bandwidth constraints, halt delivery of the content. If however, no response (or a negative response) is received, a "program not available" (PNA) message may be provided to the user, and the stream taken down. As discussed below, the "program not available" message may also be provided to requesting users when there is insufficient bandwidth to accommodate a user request, and no currently provided streams may be torn down.

Carrier reclamation may be disabled (i.e., a carrier may not be reclaimed and/or reassigned regardless of the number of subscribers currently viewing programming provided thereon) via rules and/or inputs stored and implemented by the controller 206. For example, in one embodiment, rules may be provided which mark certain content as "high priority" or "protected" content. Accordingly, when requests for other content are received, and there is not already an assigned carrier for the delivery of the requested content and there is currently no available carrier, the controller 206 will not reclaim carriers currently providing the high priority or protected content. Resource contention mechanisms may be provided in the instance the requested content is also labeled as "high priority" content, such as a first come-first served mechanism, or a priority ranking mechanism. This may be implemented by e.g., omitting pings of subscribers which are currently receiving the high priority content. In other words, where particular content is deemed high priority or protected, subscribers receiving the content may not be pinged.

Alternatively, the subscribers' devices receiving the high priority content may be triggered to automatically respond to any pinging messages in a prescribed fashion (discussed below). In this manner, the system is notified, and/or assumes that the selected carrier for that programming will not be reclaimed. The foregoing logic may be implemented for carriers, subscribers, devices, etc. which are marked as high priority as well; e.g., a high priority carrier will not be reclaimed regardless of what content it is carrying, or a high priority CPE will not have any carrier associated with content selected for current viewing by that CPE reclaimed.

In another embodiment, rules may be provided which (i) disable carrier reclamation in instances where one or more metrics of demand/popularity (e.g., the number of requests, and/or the number of subscribers to which the content provided by the carrier is currently being delivered), exceeds a threshold, or conversely (ii) re-enable reclamation (after having been disabled) when the metric(s) fall below a threshold. In one such model, carriers carrying content which is particularly popular may be excluded from reclamation. This may be implemented by first determining the popularity of content using one or more of the foregoing metrics (such as by number of subscribers currently viewing, ratings, or estimations), then, as noted above, omitting to ping subscribers receiving the identified content, or enabling these to respond automatically to a ping signal.

It will be appreciated that the foregoing thresholds for disablement/re-enablement of carrier reclamation may be static and/or dynamic in nature, and moreover the two thresholds may be set at differing values if desired. For example, in one variant, a static threshold is used for the disablement threshold value under certain circumstances (e.g., periods of low content demand fluctuation), whereas a dynamically determined value is invoked during other periods. In another variant, the disablement threshold is static (or dynamic), while the re-enablement threshold is dynamic (or static). In yet another variant, the two thresholds are coupled so that changes to one are reflected in the other, and vice versa.

Any number of additional mechanisms for identifying and assigning priority to certain carriers may be utilized, including e.g., identification based on what is known about the subscribers receiving the content. The aforementioned, previously referenced U.S. patent application Ser. No. 12/775,034 provides an exemplary mechanism for disabling reclamation for commercial subscribers. However, other subscribers (e.g., highest tier subscribers, and the like) may also be afforded the reclamation disabling/re-enablement feature.

In yet another embodiment, disabling the reclamation of certain carriers (such as based on requesting user or device, particular content, number of requestors, etc.) may be implemented by causing the subscriber devices associated with the reclamation-disabled carriers to automatically return a response to a ping request without user intervention. Suppose for example, that a particular program is identified as high priority or protected. Rules are established indicating that one or more carriers delivering the particular program should not be subject to reclamation despite the number of viewers currently viewing the program. Accordingly, a message may be provided to each of the CPE 106 receiving the particular content. The message may comprise an embedded trigger which is activated when a ping is received at the CPE 106. The trigger causes an immediate response to be sent to the ping. In this way, it becomes irrelevant whether a viewer is physically present at the CPE 106 (or display device in communication therewith).

In another variant, the message comprises a signal or other communication causing the device to download a software routine which, responds automatically to any ping messages, therefore not requiring a viewer to physically respond when these messages are transmitted to the device, thereby protecting the content provided thereto from reclamation. This approach is particularly useful inter alia, in giving newly "protected" CPE the capability to subsequently generate automatic ping responses where such capability is not indigenous to the CPE to begin with.

Network Controller Apparatus—

Figure 3:
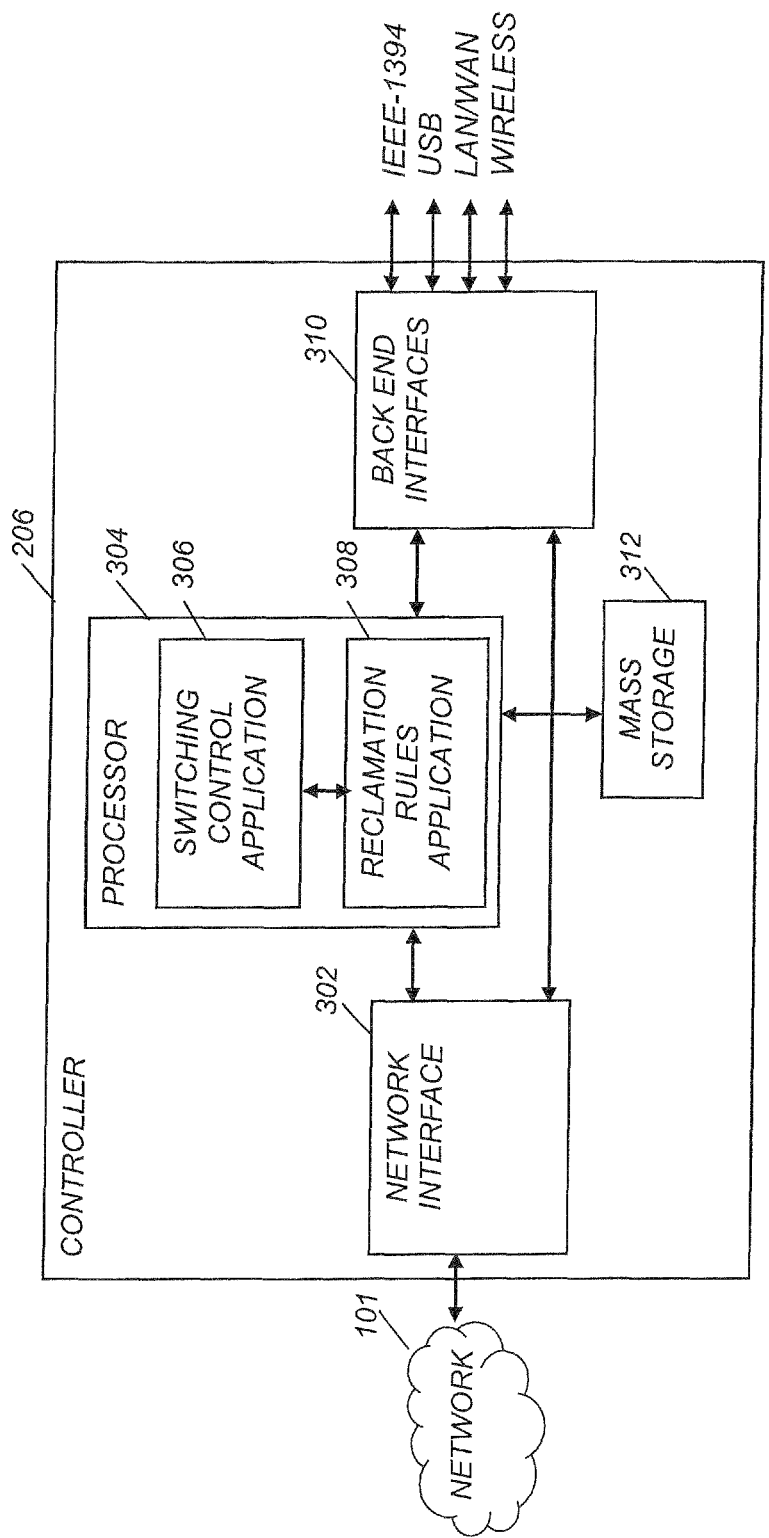
FIG. 3 is a functional block diagram illustrating a controller entity of the content delivery network architecture of FIG. 2 of the present invention.

FIG. 3 illustrates an exemplary embodiment of a controller apparatus 206 useful with the present invention. As shown, the controller 206 generally comprises a network interface 302 for communication via the network 101, a processor 304, a storage entity 312, and a plurality of back end interfaces 310 for communication with other network 101 and headend 150 entities.

The processor 302 of the controller apparatus 206 is in one embodiment adapted to run a switching control application 306 and a reclamation rules application 308. These software applications (computer programs) are generally held within computer readable media e.g., the controller memory 312 or a mass storage device such as a HDD or flash device.

The switching control application 306 is utilized by the controller 206 to control the switching of the SDV server 202. In other words, the switching controller 306 generates one or more switching control messages or signals which are provided to the SDV server 202. The control messages indicate which program streams to switch into delivery, and which to remove from delivery. In one embodiment, the control messages are based on requests received from the connected CPE 106. For example, when a request is received from a first CPE 106 for first content, the switching control application 306 determines whether the requested content is currently provided. If so, the application 306 causes a message to be sent to the CPE 106 indicating a frequency to tune to in order to receive the requested content. If the application 306 determines that the requested program is not currently provided, available carriers are identified and a message is transmitted to the BSA/SDV server 202 indicating the programming channel to be "switched in", and the carrier on which it should be carried. If a carrier is not available, the switching control application 306 works in conjunction with the reclamation rules application 308 to determine which carriers may be reclaimed. The SDV server 202 is then informed of the carriers which should be reclaimed and used to provide the newly requested content as discussed above.

The reclamation rules application 308 is utilized in one capacity to determine carriers that may be reclaimed. As noted above, the rules application 308 enforces a set of rules and/or inputs which dictate certain programs, content streams, users, etc. for which a carrier may or may not be reclaimed. The application 308 is configured to store rules which indicate high priority or protected channels, programs, users, etc. The reclamation rules application 308 works in conjunction with the switching control application 306 to apply the rules during a determination of available carriers for reclamation, and ensures that carrier reclamation follows the predetermined rules and/or inputs received from a network operator or user.

In one embodiment, the rules contained within the controller 206 are entered and edited by a network operator. The rules may be further dynamically adjusted based on e.g., network conditions, subscriber pool constituency/size, etc.

In a further embodiment, reclamation rules may be given a still further level of granularity by being specific to a subscriber or group of subscribers. For example, reclamation rules may be established indicating that, for a particular group of subscribers, one or more programs are deemed high priority, and delivery of these should not be interrupted. These subscribers may have a common delivery mode or be physically related (e.g., residing within the same service group), or merely be part of a logical grouping (e.g., those with premium subscriber agreements, those who are being provided a limited duration incentive or trial, etc.).

Moreover, combinations of the foregoing rules may be used to provide the desired functionality; e.g., one rule which prioritizes or protects certain content, in combination with another rule which protects certain devices. For instance, Boolean logic functions such as a Boolean "OR" may be applied so that reclamation is prevented where only one of the two rules, or both, are satisfied (e.g., "prevent reclamation if either protected content is being watched on an unprotected device, or unprotected content is being watched on a protected device, or both), or a Boolean "AND" (where both must be satisfied for reclamation to be prevented). The reclamation prevention may also be masked according to one or more criteria; e.g., time of day, day of the week, geographic location (e.g., zip code), psychographic or demographic profile of the subscriber, etc. Myriad other combinations and logical functions will be recognized by those of ordinary skill given the present disclosure.

It is also noted that the above-described ping messages may be sent from the control application 306 (at the discretion of the rules application 308) to the CPE 106 to determine whether the subscribers receiving a particular stream are in fact making use of the content (i.e., watching the content). Ping messages may be send to all CPE 106 without regard to the reclamation rules; in this instance, an additional message is sent to those ones of the CPE 106 which are receiving "high priority" content (and/or which are "high priority" device) causing these to respond automatically and without user validation that the content is being viewed. Alternatively, ping messages may only be provided to the CPE 106 which are not excluded under the reclamation rules (i.e., the CPE 106 which are tuned to carriers that should not be reclaimed are not pinged).

User-Controlled Content Delivery Network Architecture—

The systems and apparatus of FIGS. 2 and 3 (discussed above) are utilized for providing network-adjusted delivery of content, wherein the network/network operator, via the controller apparatus 206 and programs running thereon is responsible for determining whether carriers should be reclaimed to make room for new requests. However, it is also appreciated that in one embodiment of the invention, illustrated in FIG. 4, a user (or subscriber) may adjust delivery of content and direct carrier reclamation via an application running on the user's device (e.g., CPE 106).

Figure 4:
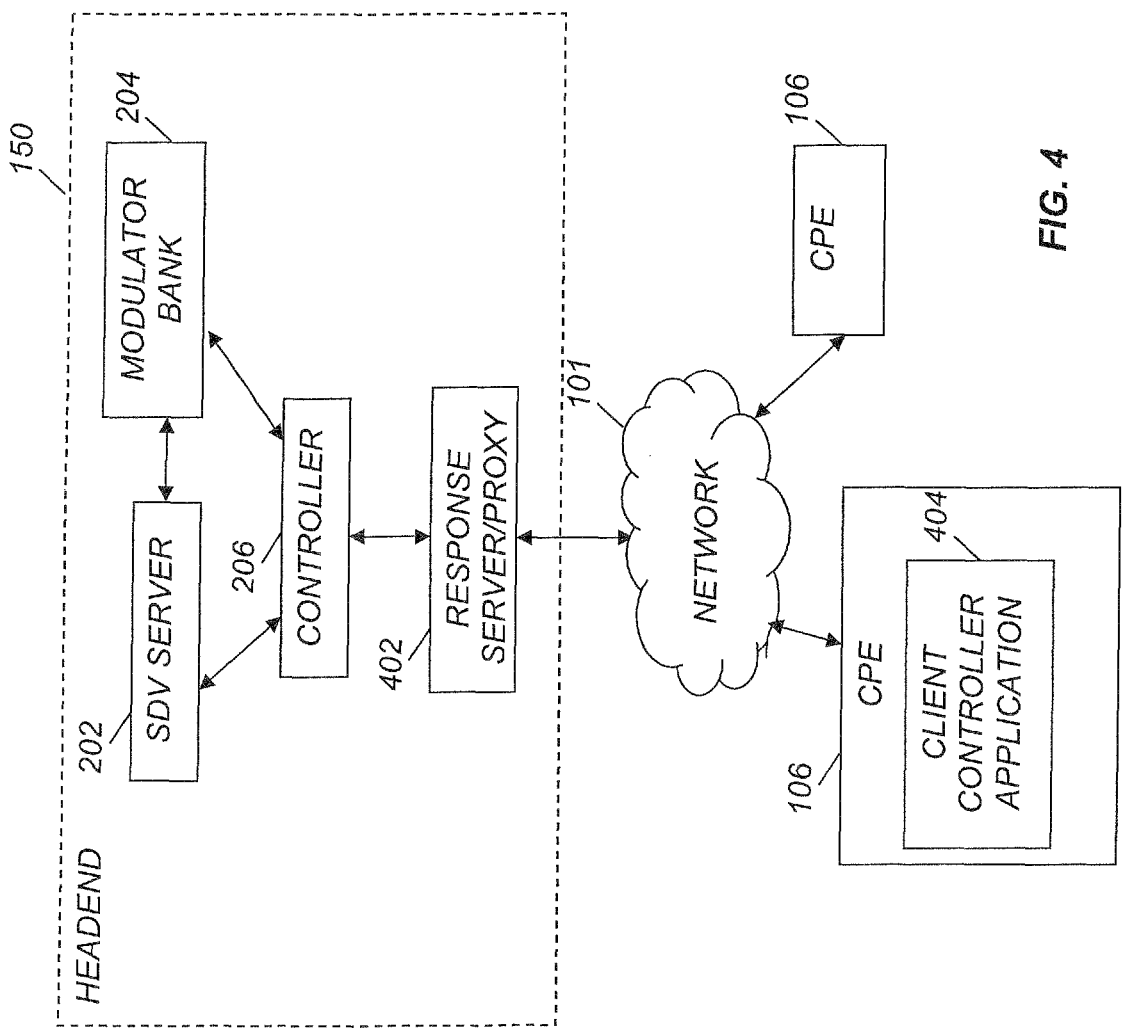
FIG. 4 is a functional block diagram illustrating a content delivery network architecture for providing user-controlled reclamation in accordance with a second embodiment of the present invention.

The network architecture of FIG. 4 generally comprises a network headend 150 having, inter alia, an SDV or BSA server 202, a modulator bank 204, a controller 206 and a response server/proxy 402. The SDV server 202 and modulator bank 204 in the embodiment of FIG. 4 perform generally the same function as that described above with respect to FIG. 2. In particular, the SDV server 202 and modulator bank 204 provide program materials to subscribers on an as-needed basis. The controller 206 causes the SDV server 202 to switch selected program data streams to the modulator bank 204 based on inputs received from the controller.

However, in combination with and/or in place of the controller-implemented rules discussed above, additional adjustments to the ability of the SDV server 202 to reclaim carriers may be provided from a client controller application 404 running on the CPE 106. According to this embodiment, the response server/proxy 402 acts as a proxy or go-between for the application 404 running on the CPE 106.

Figure 4A:
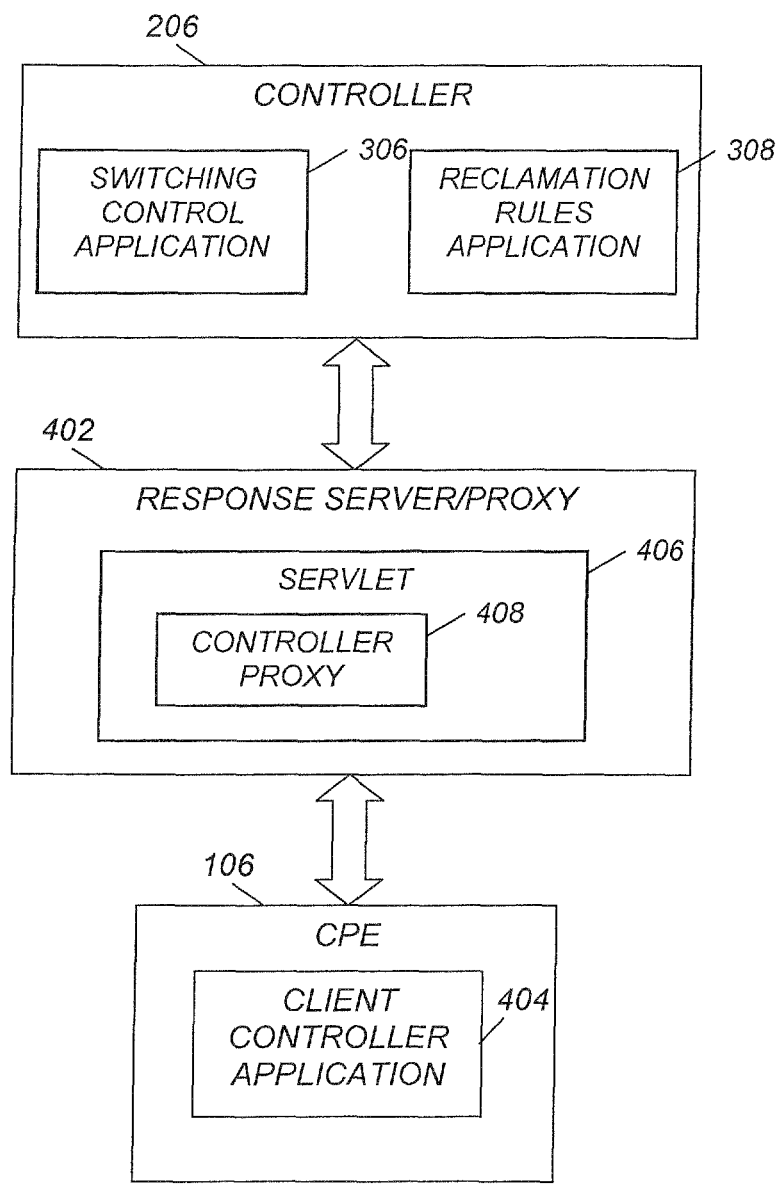
FIG. 4a is a functional block diagram illustrating interaction between the servlet, the controller, and a CPE of FIG. 4 of the present invention.

As shown in FIGS. 4 and 4*a*, the network comprises a Java servlet 406 running on a server entity 402 located at the headend 150 or other node of a network. The servlet 406 is in communication with several CPE 106 via a network (e.g., HFC network 101). The servlet 406, in one embodiment, acts as a proxy for communication between the CPE 106 and the controller 206 (and applications running thereon) also located at or in communication with the headend 150. Users associated with the CPE 106 may access the controller 206 applications including e.g., the reclamation rules application 308 using client software applications 404 running on the CPE 106 (discussed below). The CPE 106 and server 402 communicate via the HFC network 101 either via an out-of-band upstream RF channel, an upstream DOCSIS channel, or a separate transport such as a wireless (e.g., WLAN or WiMAX) or other IP network (not shown).

The client controller application 404 in one embodiment utilizes the Enhanced TV Binary Interchange Format (EBIF), the latter as described in CableLabs OpenCable Application Platform (OCAP) publication entitled "Enhanced TV Binary Interchange Format 1.0" OC-SP-ETV-BIF1.0-I04-070921, issued Sep. 21, 2007, which is incorporated herein by reference in its entirety. The EBIF content format, inter alia, defines an optimized collection of "widget" and byte code specifications for displayed "pages" within a client controller application 404. These pages are specialized for use within an enhanced television or interactive television system. It is via the EBIF content format in the present embodiment that the controller application 404 may generate viewable and "inter-actable" pages, although it will be appreciated that other formats and protocols may be used consistent with the invention. In the present embodiment, the EBIF client application 404 enables the user of the client device (CPE 106) to enter commands which are transmitted to the controller 206 via the response server proxy 302 running a controller proxy 408 on a servlet thereof 406.

EBIF is a binary application format that is device and network independent and provides a portable application to ITV applications. EBIF applications package all the graphic directives to render the application on a client device, as well as lightweight run-time byte code event driven procedures that can be processed on the user agent on client device to enable interactive applications. EBIF can be considered somewhat equivalent to HTML/Javascript pages on the Internet, except in binary form.

The response server/proxy 402 is, in the illustrated embodiment, also adapted to directly or indirectly communicate with the controller 206. The controller 206 controls the delivery of content via a switching control application 306 and a reclamation rules application 308. In this manner, a CPE 106 running the client application 404 provides the user with a substantially unified environment by which the user may enter commands to further control the delivery of content via e.g., the reclamation rules application 308. For example, a user may designate (via the application 404) their CPE 106 as a high priority or "protected" device, thus disabling requisition of data streams delivered thereto. The user may further designate that the delivery of certain programs or content is high priority/protected, and thus disable carrier requisition.

In one embodiment, communication between the client application 404 of the CPE 106 and the applications 306, 308 of the controller 206 occurs via the servlet proxy 406 running on the server 402 utilizing an OOB modem and/or a QAM modulator and QAM channels. It is further appreciated, however, that communication between the various entities of the present invention may be accomplished via literally any communications channels or modes (whether wired, optical, or wireless), the aforementioned being merely exemplary in nature. Transcoding between the EBIF application 404 format and a format utilized by the controller 206 may also be performed by the response server/proxy 402 (discussed below), or another entity tasked with such function.

In the illustrated embodiment, the servlet 406 comprises computer software run the response server 402 of the network headend 150. The server 402 may comprise an OpenCable-compliant network server or controller module adapted for use at the headend or hub site(s) of FIGS. 1-1*c*, although the server may comprise other types of devices (e.g., VoD or application servers, SRM or other supervisory processes, etc.) within the network as previously described.

The server 402 may take any number of physical forms, comprising for example one of a plurality of discrete modules or cards within a larger network headend, edge or hub device of the type well known in the art. The server 402 may also comprise firmware, either alone or in combination with other hardware/software components such as those previously described. Alternatively, the server 402 may be a stand-alone device or module disposed at the headend, hub or other site, and may even include its own RF front end (e.g., modulators, encryptors, etc.) or optical interface so as to interface directly with various portions of the HFC network 101. Numerous other configurations may be used. The server 402 may also be integrated with other types of components (such as satellite transceivers, encoders/decoders, etc.) and form factors if desired.

Moreover, different cable or satellite system headends may share components between them, and/or have multiple ones of components installed for e.g., redundancy/failover protection, different tasking or service, etc.

It is appreciated that various subsystems and components shown in FIGS. 4-4*a* can be combined with others, or functions performed thereby distributed across different functional (e.g., hardware or software) entities already within the content delivery network.

It can also be appreciated that the various aspects of the present invention may be practiced using any configuration or combination of hardware, firmware, or software, and may be disposed within one or any number of different physical or logical entities. For example, the functionalities associated with the reclamation rules application 308 may take the form of one or more computer programs (e.g., "stand-alone" network and client processes). Alternatively, such computer programs may have one or more components distributed across various hardware environments at the same or different locations, such as where a network process is distributed across multiple platforms at the hub site and the headend 150.

As yet another example, portions of the functionality may be rendered as a dedicated or application specific IC having code running thereon. Myriad different configurations for practicing the invention will be recognized by those of ordinary skill in the network arts provided the present disclosure.

Server and Servlet—

Figure 5:
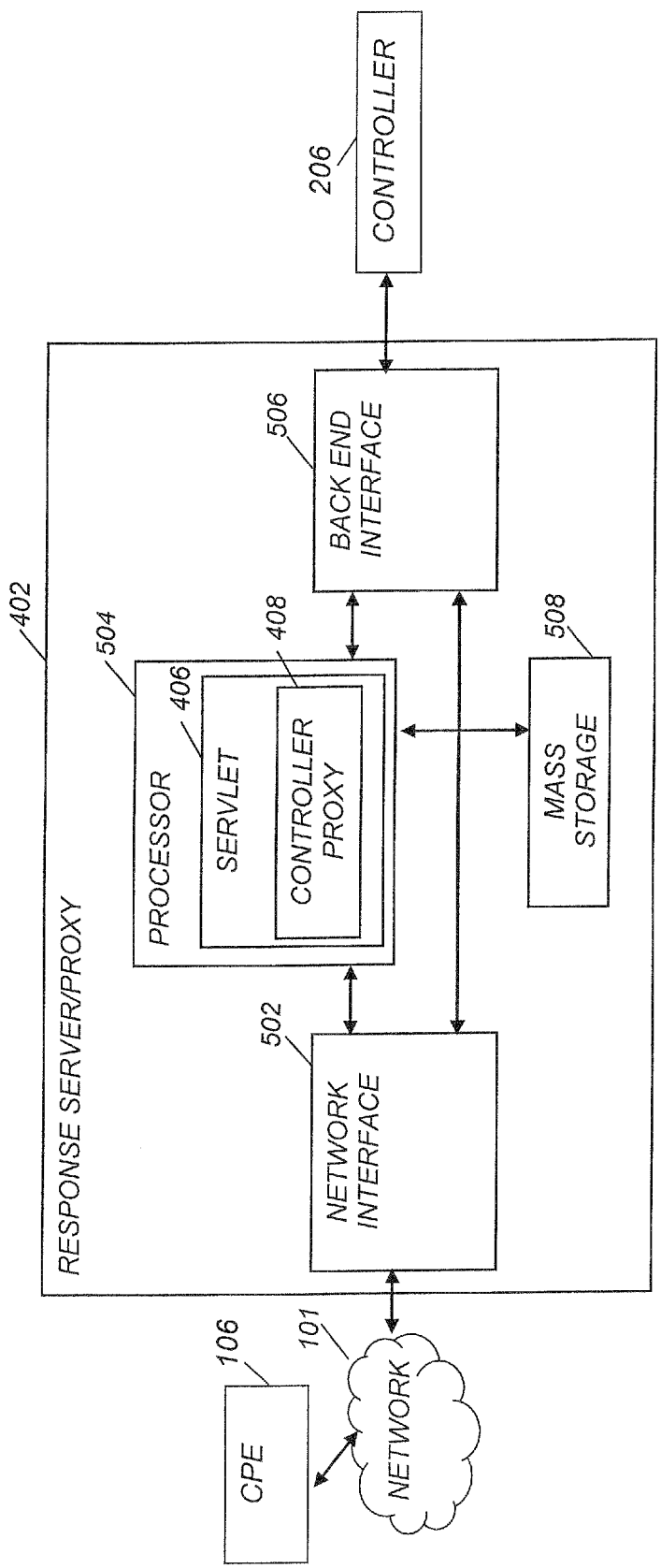
FIG. 5 is a functional block diagram illustrating an exemplary response server/proxy for use in the architecture of FIG. 4 of the present invention.

Referring now to FIG. 5, one embodiment of the response server/proxy 402 shown in FIGS. 4 and 4a is illustrated and described. As shown in FIG. 5, the server 402 comprises a digital processor(s) 504 and associated storage 508, a network interface 502 for interfacing with the HFC network 101 and one or more back-end interfaces 506 capable of interfacing with the applications of the controller 206 (and/or other components/devices).

Specifically, in one embodiment, the network interface 502 and/or the back-end interface(s) 506 comprise a plurality of interfaces for use with other network apparatus such as RF combiners, IP routers and other packet network devices, network management and provisioning systems, local PCs, etc. In other variants, the interfaces 502, 506 may comprise e.g., an IEEE-1394 interface, a USB interface, a LAN interface, an ASI/GBE interface, etc., depending upon the particular implementation.

Other components which may be utilized within the server 402 include amplifiers, board level electronic components, as well as media processors and other specialized SoC or ASIC devices. Support for various processing layers and protocols (e.g., 802.3, DOCSIS MAC, OOB channels, DHCP, SNMP, RTP/RTCP, VoIP, SIP, etc.) may also be provided as required, such as in support of data and rules interchange between the server 402 and one or more of the applications 306, 308 of the controller 206 and/or CPE 106.

The network interface 502 and back-end interface(s) 506 enable communication between the server/proxy 402 and other devices of the network 101. For example the server 402 may receive and transmit priority adjustments entered by a user via a client controller application 404 to the controller 206 (or directly to the SDV server 202) via the network interface 502. In one embodiment, the server/proxy 402 (via the controller proxy 408) transcodes messages between the CPE 106 and controller 206 (or other entity).

As illustrated in FIG. 5, the response server 402 runs at least a servlet 406. In one embodiment, the servlet 406 comprises one or more Java programming language objects that dynamically process requests and construct responses. In one specific implementation (see FIG. 4a above), the servlet 406 acts as a proxy between the CPE 106 and the reclamation rules application 308 of the controller 206. However, the rules application 308 may utilize a content format that is not readable and/or useable by the CPE 106. Accordingly, the servlet 406 and controller proxy 408 running thereon enable communication between the CPE 106 (client application 404) and the controller (reclamation rules application 308) by converting messages between the two formats.

Figure 5A:
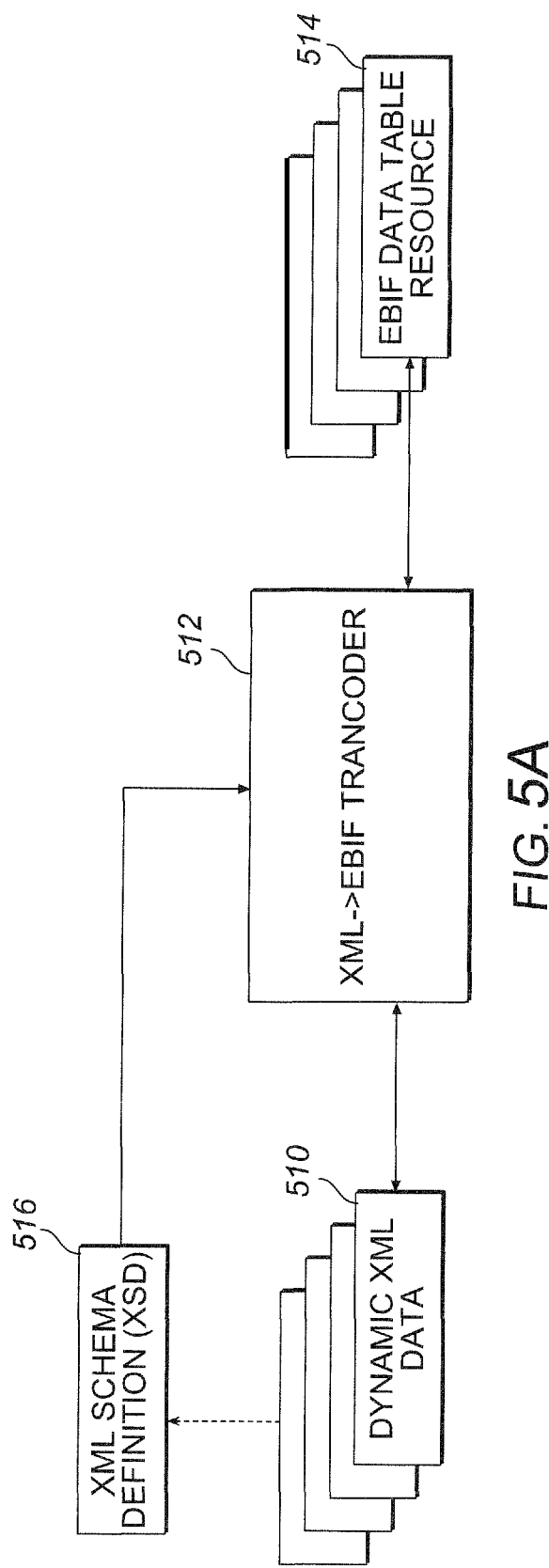
FIG. 5a is a functional block diagram illustrating one embodiment of transcoding mechanisms for use within the present invention.

In the embodiment of FIG. 5a, communication between the CPE 106 and controller 308 may generally comprise (i) receipt of a request for access to the reclamation rules application 308 from the CPE 106, (ii) conversion of the request to a format suitable for the controller 206, (iii) receipt of a response from the rules application 308, (iv) conversion of the response to a format suitable for the CPE 106, and (v) transmission of the response to the CPE 106 in the appropriate format. Additional and subsequent communication between the client application 404 running on the CPE 106 and the rules application 308 of the controller 206 may further utilize the servlet 406 for format conversion as discussed above and illustrated in FIG. 5a. While illustrated as being configured to convert XML to EBIF, the transcoder functionality of the response server 402 may be configured to transcode any number of data formats to and from EBIF (or even other formats). Hence, in this capacity, the servlet acts as a protocol translator of sorts between heterogeneous entities on the network which might not otherwise communicate.

If, however, the reclamation rules application 308 does not utilize a format which is non-compliant with that of the CPE 106 (i.e., if the formats are compliant), the servlet 406 does not act as a proxy, but instead may redirect the CPE 106 to communicate directly with the application 308. Such communication may utilize a "REFER" message set-up, such as e.g., that utilized in SIP (Session Initiation Protocol) sessions as described in RFC 3515 dated April 2003 entitled "The Session Initiation Protocol (SIP) Refer Method", which is incorporated by reference herein in its entirety, although it will be appreciated that other protocols may be used if desired. According to this model, upon request to instantiate communication, a REFER message is provided to the CPE 106; the REFER message indicates to the CPE 106 that it may directly contact the compatible application 308, and in some instances provides information useful in assisting the CPE 106 in doing so (such as address information of the rules application 308, device capabilities, etc.). The CPE 106 may then send a SIP INVITE message to the compatible rules application 308. The compatible rules application 308 and the CPE 106 share the same content/messaging format, hence are able to communicate directly. Once successful communication is established, the client application 404 running on the CPE 106 and the compatible rules application 308 (running on the controller 206) may continue to communicate utilizing the compatible format, with the servlet (proxy) being removed from the process.

CPE—

Figure 6:
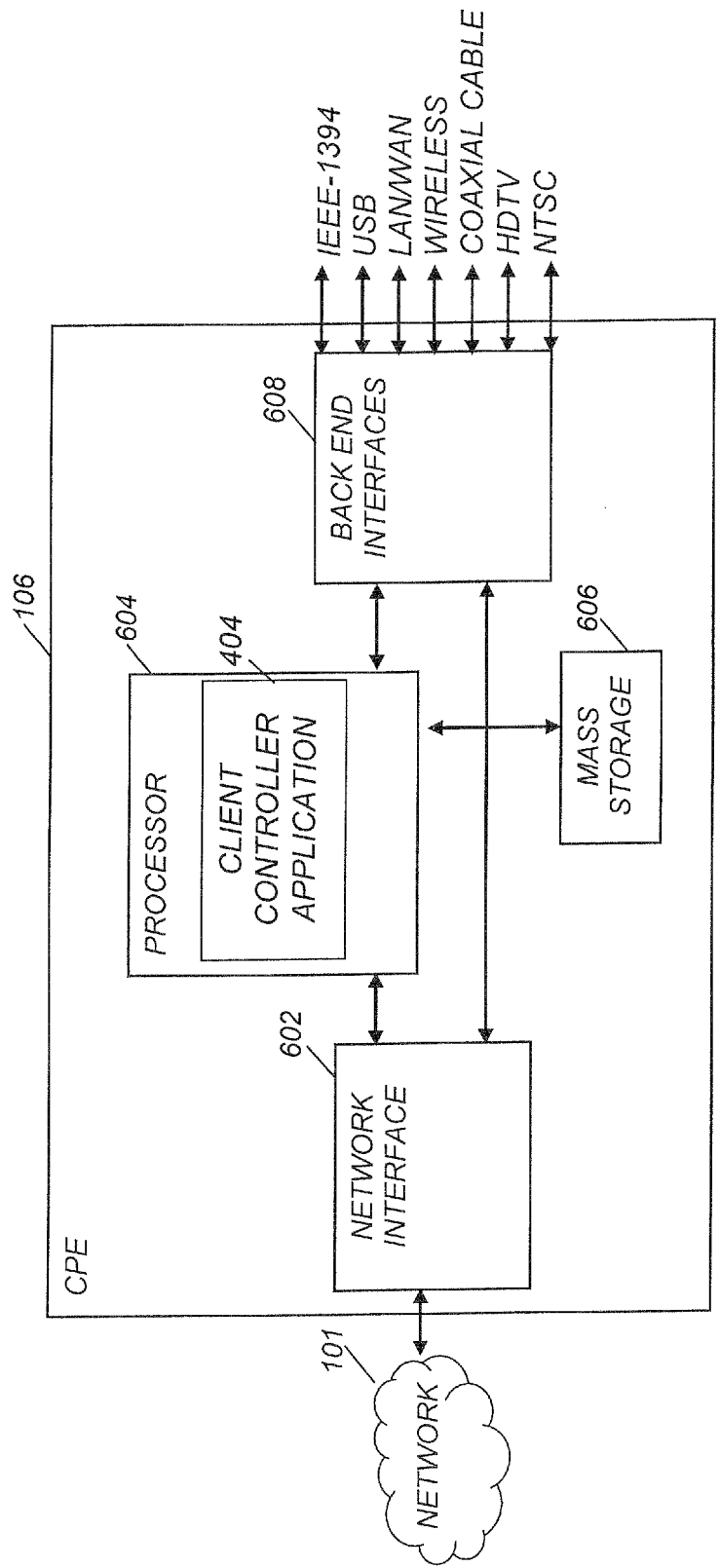
FIG. 6 is a functional block diagram illustrating one embodiment of a CPE for use in the present invention.

In FIG. 6 an exemplary embodiment of a CPE 106 configured according to the present invention is illustrated. As shown in the simplified diagram of FIG. 6, the device 106 generally comprises a network interface 602 for interface with the HFC network 101 of FIGS. 1-1c, a digital processor(s) 604, storage device 606, and a plurality of interfaces 608 (e.g., video/audio interfaces, IEEE-1394 "FireWire", USB, serial/parallel ports, etc.) for interface with other end-user apparatus such as televisions, personal electronics, computers, Wi-Fi or other network hubs/routers, etc. In one embodiment, the interface 602 comprises an RF front end including a tuner and demodulator/decryptors. Other components which may be utilized within the device (deleted from FIG. 6 for simplicity) include various processing layers (e.g., DOCSIS MAC or DAVIC OOB channel, MPEG, etc.), as well as media processors and other specialized SoC or ASIC devices. The CPE 106 may also include an integrated HD decoder, thereby relieving any connected monitors or other devices from the requirement of having such a decoder. Still further, the CPE 106 may include an OpenCable (OCAP)-compliant embedded system. These additional components and functionality are well known to those of ordinary skill in the cable and embedded system fields, and accordingly not described further herein.

The CPE 106 of FIG. 6 may also provided with an OCAP 1.0-compliant application and Java-based middleware which, inter alia, manages the operation of the device and applications running thereon. It will be recognized by those of ordinary skill that myriad different device and software architectures may be used consistent with the functions of the present invention, the device of FIG. 6 being merely exemplary. For example, different middleware (e.g., MHP, ARIB, or ACAP) may be used in place of the OCAP middleware of the illustrated embodiment.

The exemplary CPE 106 further include a conventional "Watch TV" application or the like, which services those program or user channels available over the network. The Watch TV application, residing in memory, provides such functions as channel navigation control, channel selection in response to a channel change event, etc. These functions may also be integrated with the aforementioned client application 404 if desired.

In the illustrated embodiment, the digital processor 604 is adapted to run at least one client controller application 404. The client application 404 enables a user to specify particular programming or the device itself as high priority. In a further embodiment, the client application 404 is utilized to send the adjusted priority to the controller 206 (via a response server/proxy 402) to ensure that carriers associated with the particular program or CPE 106 are not reclaimed.

Figure 6A:
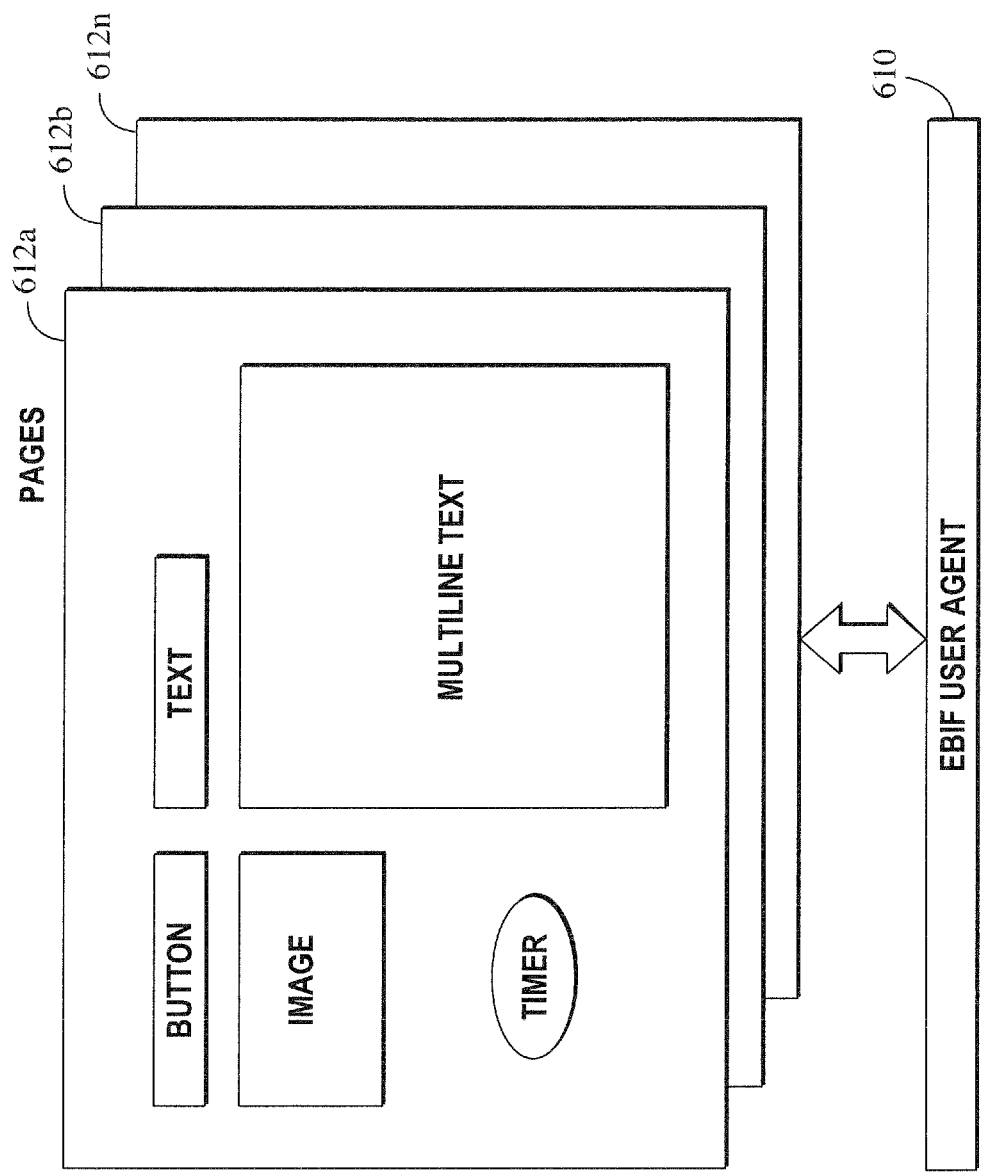
FIG. 6a is a functional block diagram illustrating the interaction between an exemplary user agent of the CPE of FIG. 6 and a controller application of the present invention.

As noted above, in one embodiment, the client application 404 comprises an EBIF-based application. As illustrated in FIG. 6a, the user interface may comprise an ETV/EBIF user agent 610 which is adapted to acquire, decode, present, and execute "widgets" and actions contained in an EBIF resource file, such as those which comprise the various pages 612a, 612b, 612n of the aforementioned client controller application 404. The "widgets" herein being of the type described in previously referenced OCAP publication entitled "Enhanced TV Binary Interchange Format 1.0" OC-SP-ETV-BIF1.0-I04-070921, issued Sep. 21, 2007, and incorporated herein by reference in its entirety.

Various pages 612 of the EBIF application 404 are presented to the user via the user agent 610. The pages 612a, 612b, 612n may comprise user interfaces which are displayed to the user when the client controller application 404 is run. The user agent 520 provides, along with its host hardware environment, the ability for the user to navigate and interact with the pages of the application 404, thus enabling user-controlled priority adjustments and inputs as discussed above.

In yet another embodiment, the CPE 106 comprises a converged premises device, such as for example that described in co-owned U.S. patent application Ser. No. 11/378,129 filed Mar. 16, 2006, issued as U.S. Pat. No. 8,347,341 on Jan. 1, 2013, and entitled "METHODS AND APPARATUS FOR CENTRALIZED CONTENT AND DATA DELIVERY", incorporated herein by reference in its entirety. As discussed therein, the CPE may be adapted to function as a home gateway device, (such as e.g., the "Furnace" product offered by Applicant hereof). Leveraging a home gateway device has the advantage of offloading more centralized computing/processing to more distributed computing/processing, while still supporting the less-capable devices within the premises.

In a still further embodiment, the CPE 106 comprises a media bridge apparatus, such as for example, that described in co-owned and co-pending U.S. patent application Ser. No. 12/480,597 filed on Jun. 8, 2009 and entitled "MEDIA BRIDGE APPARATUS AND METHODS", which is incorporated herein by reference in its entirety. According to this embodiment, a first CPE 106 may be utilized to adjust or modify bandwidth reclamation rules for a plurality of devices in communication therewith (e.g., back-end or downstream connected devices).

User-Controlled Directly Accessible Content Delivery Network Architecture—

The systems and apparatus of FIGS. 2 and 3 (discussed above) are utilized for providing network-adjusted delivery of content. FIG. 4 illustrates an embodiment where a user (or subscriber) may provide inputs and/or adjust delivery of content (including carrier reclamation) via an application running on the user's device (e.g., CPE 106) in communication with a network proxy 402.

In current client devices, an SDV client is built into the CPE code and the user cannot interact with the SDV screen unless the user accesses an appropriate EBIF application. However, in one embodiment, the SDV client functionality may be removed from the CPE. Instead, the CPE may rely on a downloadable application for SDV client functions including enabling and/or disabling bandwidth reclamation as discussed herein. In this manner, the SDV client functions may be updated without having to send a representative or technician to the field. In one variant, the SDV client downloads and runs in a manner similar to the download and running of an EBIF client application. The downloadable SDV client graphical user interface (GUI) may be tailored to provide specific options to specific markets. For example, the GUI for a commercial subscriber (such as a restaurant or bar) may include features such as so-called "non-intrusive" bandwidth reclamation features whereas residential subscribers may only be presented with so-called "intrusive" features. In another variant, telescoping functions may be integrated into the GUI to enable the user to access additional related functions. The GUI buttons of the downloadable SDV client may interact directly with an SDV (or BSA) server. Alternatively, the GUI button presses may be transmitted to an EBIF back office, and subsequently transmitted to the SDV server. The EBIF back office may perform an authentication and/or billing transaction prior to transmission of e.g., setting a disabled bandwidth reclamation feature to the SDV server. In one embodiment, the downloadable SDV client may be downloaded to the CPE when device boots, for example, as a part of an EBIF user agent download.

Figure 7:
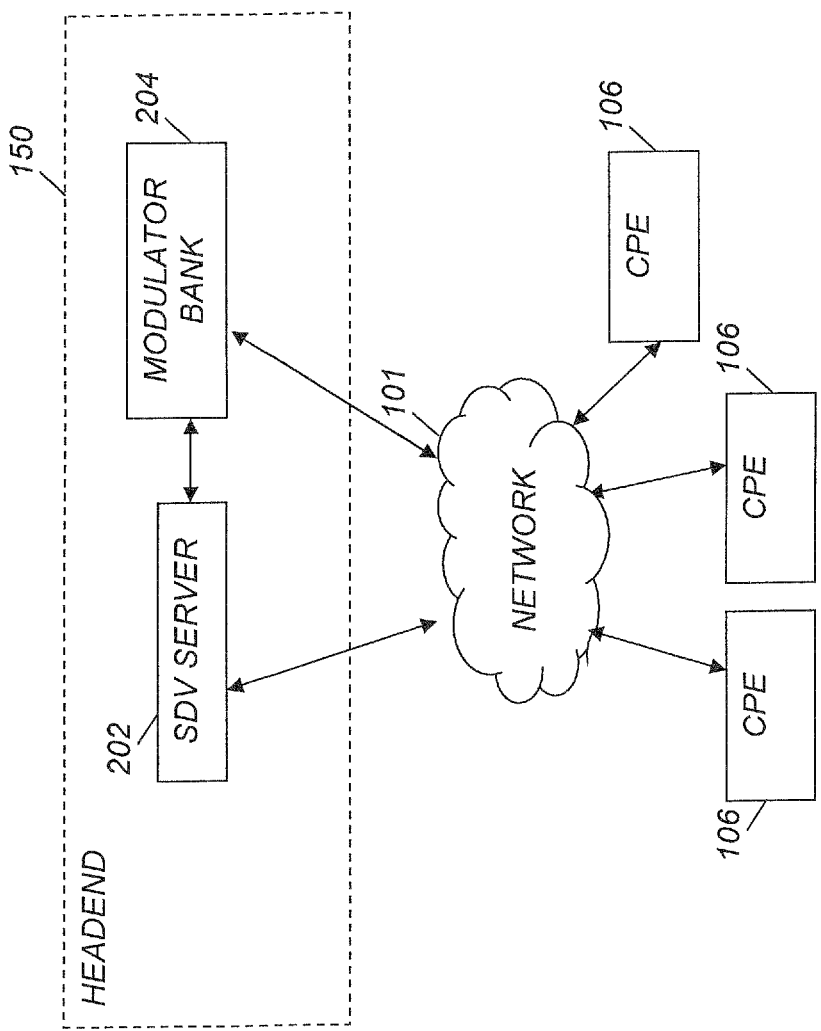
FIG. 7 is a functional block diagram illustrating a content delivery network architecture for providing user-controlled reclamation in accordance with a third embodiment of the present invention.

Referring now to FIG. 7, a third embodiment of a network architecture for user-controlled adjustments to content delivery is illustrated. The embodiment of FIG. 7, while user-adjustable does not rely on a network proxy, but instead utilizes an overlay to the delivery mechanism (e.g., an SDV overlay). The network architecture of FIG. 7 generally comprises a network headend 150 having, inter cilia, an SDV server 202 and a modulator bank 204 in communication with a plurality of user devices 106. The SDV server 202 and modulator bank 204 provide program materials to subscribers on an as-needed basis.

To provide for the user-initiated selection of programs and/or devices for which carriers should not be reclaimed, the embodiment of FIG. 7 utilizes an overlay (not shown) as part of the SDV content delivery to the user. The overlay may comprise a transparent screen which is placed on top of a currently viewed stream. Alternatively, a separate, non-transparent screen may be used. The user directly interfaces with the SDV server 202 via the overlay, and via user selections received via an input device (e.g., button presses at the user's remote control device). The inputs are linked to e.g., marking certain programs as high priority (or protected), marking the user's device as such, marking other devices in the user's network as such, etc. The SDV server 202 implements these rules when determining which carriers to reclaim in the event sufficient bandwidth for new requests is not available.

Methodology—

Figure 8:
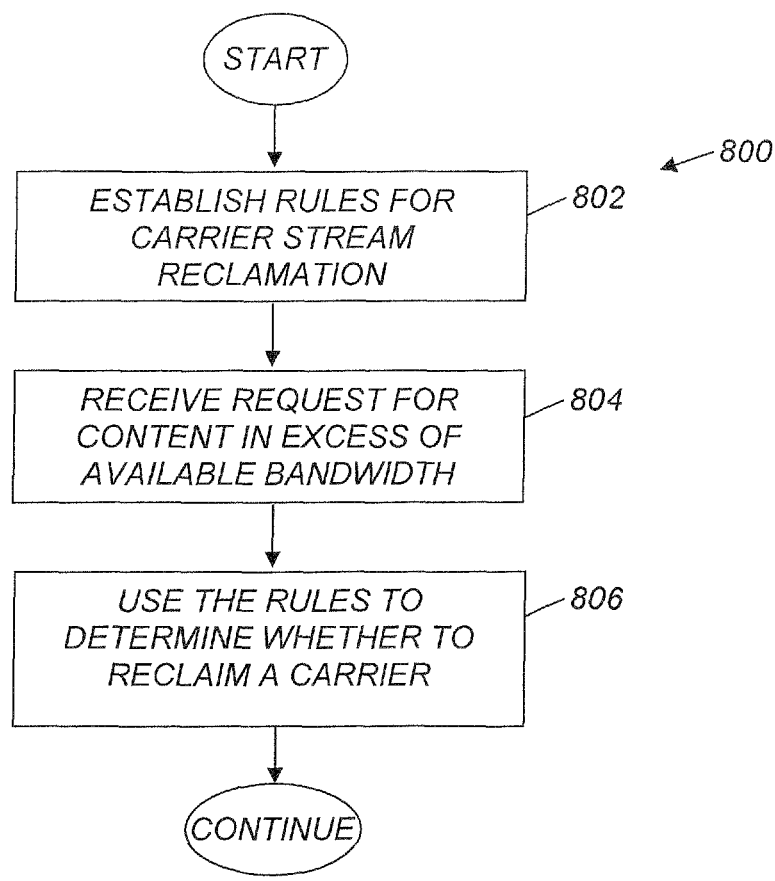
FIG. 8 is a logical flow diagram illustrating one embodiment of a generalized method for providing adjustable reclamation according to the present invention.

Referring now to FIG. 8, an exemplary embodiment of a generalized method 800 for controlling carrier reclamation with respect to certain ones of the carriers, program streams, CPE, users, etc. according to the present invention is illustrated.

As shown, per step 802, rules are established for the teardown of carriers (i.e., carrier reclamation). Alternatively, the rules may be established by the entry of one or more inputs from a user either directly to the SDV server 202, or to the controller 206 via a client application 404 and a network proxy 402. The rules indicate certain content, devices, users, or, in some instances, particular carriers as having a high priority. Moreover, combinations of the foregoing may be used as previously discussed.

Next, per step 804, a request is received for content. When it is determined that there is not an available carrier to deliver the requested content (i.e., the request exceeds the available bandwidth), the controller 206 (or in some instances the SDV server 202 itself) determines which carrier streams it may reclaim in order to provide the newly requested content. Per step 806, the priority rules are utilized to determine whether to teardown certain ones of the carrier streams.

In one embodiment, the priority rules exempt certain ones of devices, streams, and/or users from being pinged. That is to say, when it is determined that a request for content cannot be filled without tearing down a stream, the controller 206 (or other entity) sends out a pinging message to certain devices. The devices which are pinged (or alternatively which are exempted from pinging) may include e.g., those which have had recorded interaction with the delivered content (e.g., have tuned to the content) within a given period of time. Alternatively, all devices may be pinged. As noted, the rules may also exempt certain devices from receiving the pinging message. For example, those devices receiving certain programming, devices associated to certain users, devices currently tuned to programming from a particular carrier, devices having demonstrated recent activity, etc. maybe exempted. In this model, the system in effect assumes that these (exempted) devices are actively viewing the content being delivered to them, and thus simply does not ping them.

In another embodiment, the priority rules are utilized to provide automatic response messages to the devices receiving certain programming, associated to certain users, currently tuned to programming from a particular carrier, etc. The automatic response messages cause the devices to automatically send a response to any pinging message without the actual interaction of the user. In other words, rather than singling out particular devices to ping and not to ping, the system pings all devices. The devices which are marked either by the user or by the network as high priority/protected are caused to automatically respond to the pinging message without actual user interaction with the message (i.e., the response is sent automatically and without presentation of the pinging message to the user based on the previously or currently received automatic response messages).

Figure 9:
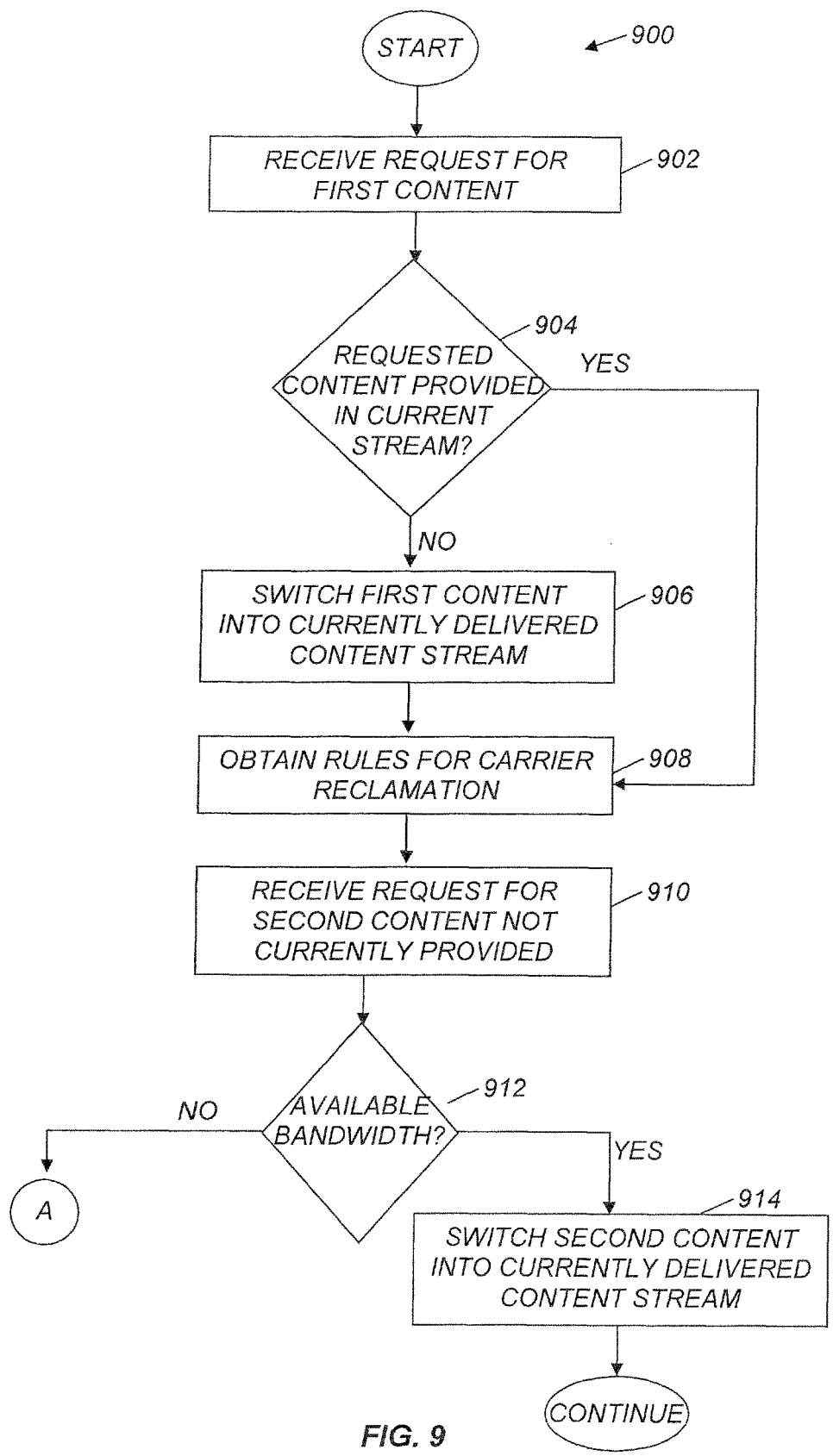
FIG. 9 is a logical flow diagram illustrating one implementation of the generalized method of FIG. 8 for providing adjustable reclamation according to the present invention.
Figure 9:
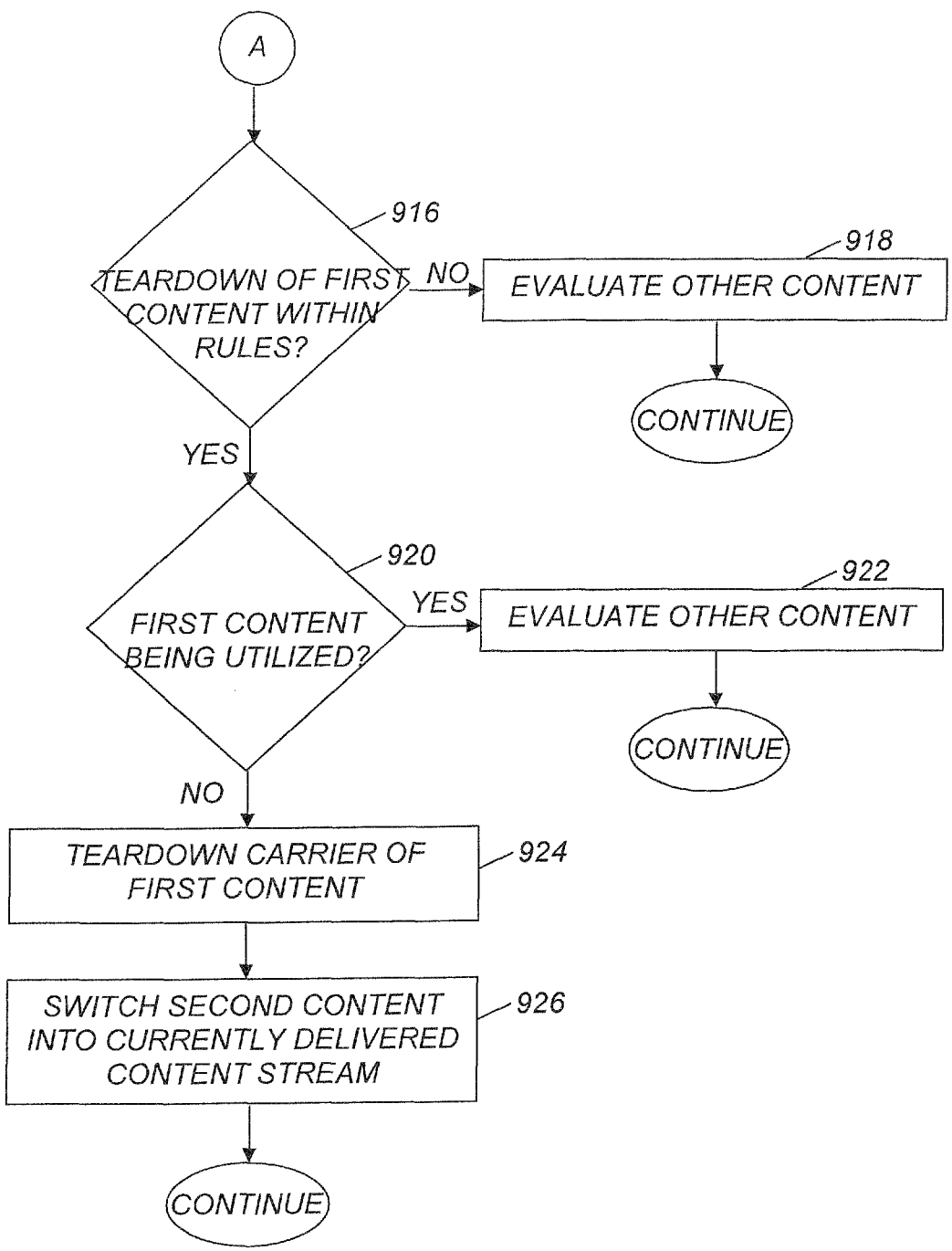

FIG. 9 is a logical flow diagram illustrating one specific implementation of the exemplary method of FIG. 8. At step 902 of the method 900, a request is received for first content. In one embodiment, the request is received from a first device in a first service group. It is determined at step 904 whether the requested content is currently provided to the service group. If so, a message providing tuning information to the requesting device is transmitted, and the method proceeds to step 908. If, however, the requested content is not currently provided to the service group, per step 906, the content is switched into the currently provided stream. It is appreciated that in certain instances sufficient bandwidth may not be available to switch the first content into the currently provided content stream. In such instances, the steps discussed below may be utilized to determine which ones of currently provided streams may be taken down to accommodate delivery of the first content.

At step 908, rules for carrier reclamation are entered, received, or accessed, depending on the particular implementation. The rules may be based on, inter alia, the device requesting the content, the carrier providing the content, the user associated with the request, as well as on the content itself. It is when the teardown of content is needed (e.g., to make room for newer requests) that the rules are consulted.

In one example, the rules are pre-positioned on the controller 206 or other network entity. Alternatively, these may be manually provided thereto by a network operator or by a user (subscriber) such as via a subscriber device directly or indirectly (such as via a proxy) in communication with the controller 206 or other entity.

Per step 910, a request for second content is received. The request for second content is received from a second device in the same service group as the first device. In other words, the requests for first and second content are to be serviced by the same set of provided carriers.

At step 912, it is determined whether there is available bandwidth to carry the requested second content. If adequate bandwidth is available, the second content is switched into delivery to the service group (step 914).

However, if there is not sufficient bandwidth, the controller 206 (or other entity) determines where bandwidth may be reclaimed. Per step 916, it is determined whether teardown of the first content is permissible under the previously specified rules. If it is not, other content is evaluated (step 918) for possible retirement. This situation may occur, for example, in instances where particular content, subscribers, devices, and/or content streams are marked (by the user and/or operator) as high priority/protected. In such cases, the system will not attempt to remove the content regardless of any actual viewership thereof. In one such implementation, the system will not send ping messages to the devices reportedly receiving the selected content or content stream to attempt to divine whether the content is actually being viewed, but instead will attempt to identify other (unprotected) bandwidth to be reclaimed.

If, however, it is permissible under the rules to attempt to remove the content, then per step 920, it is determined whether the first content is being utilized. This may be accomplished by e.g., pinging the devices reportedly receiving the content, and/or by monitoring for the physical presence of the user (such as by infrared or other active or passive detection means). If the content is being utilized, other content is evaluated for reclamation (step 922). If the content is not being utilized however (i.e., not being viewed or interacted-with by a user), the bandwidth is reclaimed (step 924), and the second content is switched into delivery (step 926).

In another embodiment, if it is determined at step 916 that teardown of the content is not permissible under the priority rules, an automatic response message is provided to devices receiving the first content. Later, the method proceeds to ping all of the available devices (or alternatively those which may potentially be subject to reclamation), including the devices receiving the first content. Those devices which were provided the trigger message (i.e., priority devices and/or devices associated with priority content, users, carriers, etc.) automatically provide an affirmative response to the ping using the trigger. Thus, without the user being made aware of the ping, it is answered so as to ostensibly indicate affirmative usage, and bandwidth is not reclaimed. In this manner, only devices which did not receive the trigger message are subject to carrier reclamation.

Preferred Media Access Control (MAC) Address—

In one embodiment, the methods and apparatus disclosed herein may be used to target a particular MAC address, and selectively disable bandwidth reclamation. In other words, particular devices may be selected (such as by the user or by a network operator) as being exempt for bandwidth reclamation.

According to this embodiment, devices having the identified MAC addresses may still get blocked while tuning, such as when the device is indicated as a so-called "pingable" device and the device does not respond to the ping.

However, once an identified device (identified by, e.g. MAC address) has tuned, the device will under no circumstances be sent an event indication banner (EIB) or program not available (PNA) message. In other words, the main or primary screen program to which this device is tuned can never be torn down during a bandwidth reclamation process from this MAC address. This is true regardless of whether the device is the only device still currently tuned to a particular program, and/or has expired the program timer (e.g., the timer used to determine when to ping devices).

Figure 10:
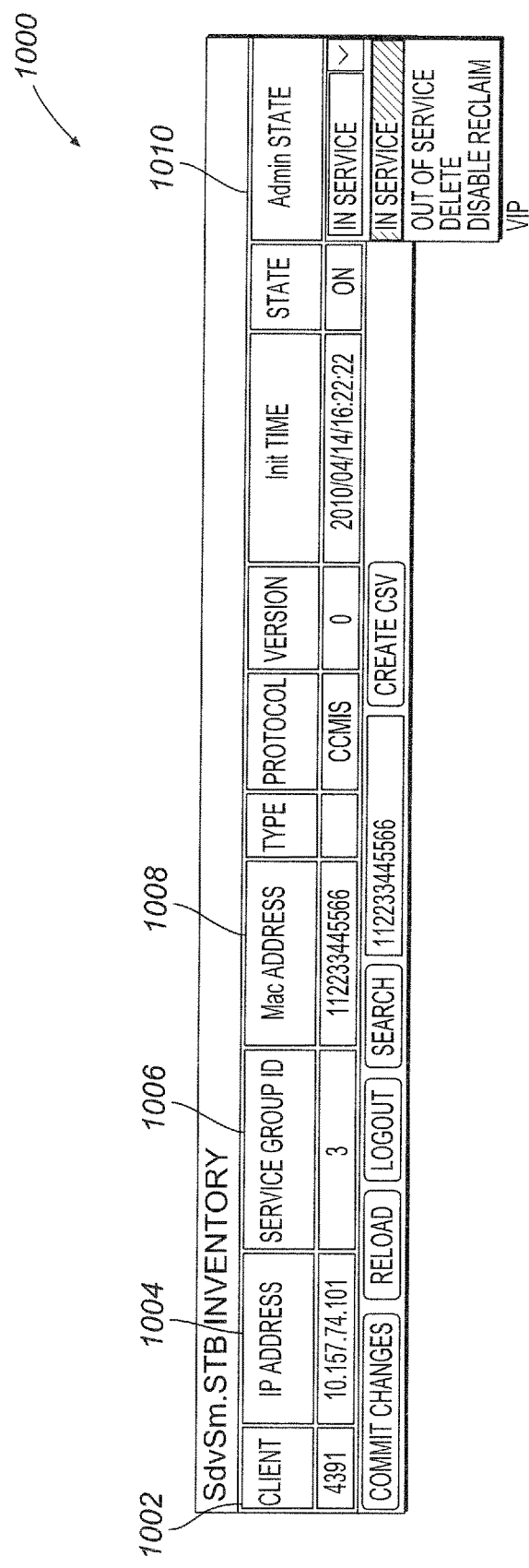
FIG. 10 is a functional block diagram illustrating an exemplary interface for selecting an administrative state for each device serviced by a switched digital video (SDV) server.

In yet another embodiment, a threshold or other timer may be applied such that after a pre-determined amount of time, if the SDV server has not received messages from the client identified by the particular MAC address, the SDV server will place the MAC back into a normal in-service administrative state (see FIG. 10). In other words, the non-intrusive method discussed herein may still "ping" the user as to whether the disabled bandwidth reclamation feature continues to be used.

In order to account for CPE having disabled bandwidth reclamation which are originally registered to a first server (given the device's geographic location) and then are changed to a new location, the server may need to be cleaned out either periodically, or manually at the time of the change. For example, MAC address of CPE may be removed from a first server via a Universal Session and Resource Manager (USRM) and registered to a second sewer. Alternatively, the USRM may be configured to periodically identify stored MAC addresses for devices which are no longer present in the system, and purge these entries.

In another embodiment, the disabling of bandwidth reclamation for a particular MAC address may be hidden from normal user access (distinguished herein as an "intrusive mode"). According to this embodiment, the device identified by the MAC address will not only have the privileges afforded as discussed above (i.e., will not receive EIB and/or PNA messages), but will also always be assured to receive the channel to which the device is tuned. That is to say, there will be no instance where the identified devices in this embodiment are subject to bandwidth reclamation methods, instead these devices (regardless of a channel tuned to and/or whether the device is in the process of tuning).

The SDV server, in this embodiment, uses any method available to it to make the bandwidth available so as to ensure that bandwidth is not reclaimed from the identified devices. For example, the SDV server may tear down background streams early, defragment, roll over into VOD QAM bandwidth, and/or tear down streams with active users in order to maintain adequate bandwidth and/or to avoid tearing down streams associated with the identified devices. The foregoing measures may be tiered or arranged in a hierarchical or logical order, such as e.g., where active user streams are used as a last resort after other measures have been exhausted, and may include e.g., subdividing or prioritizing streams based on the number of viewers impacted.

Various rules are given for determining which streams to tear down in the instance additional bandwidth is needed. The system may apply these bandwidth reclamation guidelines or rules more loosely in certain instances so as to avoid situations where guaranteed bandwidth is not available and/or to accommodate current bandwidth requirements. For example, it is not preferred to tear down streams which (i) have not recorded user interaction with the stream (i.e., button presses) for less than the allotted time, (ii) are recording, or (iii) which it is known that at least one subscriber is viewing. However, in certain instances, the system it may be necessary to tear down one of these streams in order to accommodate content delivery to devices having disabled bandwidth reclamation or are otherwise guaranteed bandwidth. The system may therefore bend the rules in an intelligent manner, so that, for example, streams are torn down which have been idle for a time period which is close or approximates the allotted time, which have fewest confirmed viewers. Streams which are recording may be protected from bandwidth reclamation or reclaimed only if no other bandwidth is available.

An exemplary interface 1000 for selecting an administrative state is illustrated in FIG. 10. In one variant, the interface 1000 may be generated by a Universal Session and Resource Manager (USRM) such as the Cisco® USRM and/or the Scientific Atlanta® USRM. As shown, user devices (such as digital set top boxes (DSTB), etc.) are listed by client number 1002, IP address 1004, service group identifier 1006, and MAC address 1008. The interface enables the user of the device and/or a network operator to select an administrative state 1010 for the particular device via a pull-down menu. In the illustrated example, the device may be placed "InService" so as to receive traditional services (i.e., bandwidth reclaimed services), and "OutofService" so as not receive any services. The interface further allows the device to be deleted (via the "Delete" option) and to be placed in a "preferred" state; i.e., so that bandwidth provided to that device is not later reclaimed (i.e., the "DisableReclaim" state).

Preferred Program—

In another embodiment, the methods and apparatus discussed herein may further be used to identify a particular program which will not be pulled out of delivery via the switched digital video or other content delivery system (i.e., bandwidth may not be reclaimed from devices tuned to this program). For example, this feature may be applied to PPV channels during high-profile events.

According to this embodiment, a user or network operator may be provided with an interface for disabling reclamation of a particular program. This may occur via an "OfferState" command of an interface, such as a USRM generated interface (see FIG. 11), or as an administrative state in a headend lineup on the session resource manager (SRM), such as the Bigband™ switched broadcast manager (see FIG. 12).

Setting a particular channel or program to have disabled bandwidth reclamation may be used to ensure that the channel or program will not be torn down under any circumstances once it has been setup due to user demand (i.e., switched into delivery in a switched digital system). Suppose for example, a subscriber tunes into a PPV channel which has a 3-hour timer (i.e., for the particular channel, after three hours of viewing the devices are generally "pinged"). Assume further that the content to which the subscriber is tuned lasts for 5 hours. According to the present embodiment, once the subscriber has tuned to the channel, even if the subscriber's device is the only device tuned to the channel, and/or the 3-hour timer has expired without receiving at the headend or service node a response to a "ping" message (or an EIB display), bandwidth associated with this channel will not be reclaimed.

In one variant, an EIB display (or "pinging" message) is never provided to the user of the devices receiving the "preferred" program. The system is instead designed to either not provide the message to these devices, or provide the devices with a means for automatically responding to the messages without requiring user interaction. Still further, the bandwidth may be preferred; i.e., not reclaimed, even if bandwidth is needed to setup other streams for other subscribers in that service group. In other words, the utilization of bandwidth for providing the preferred program may be indicated within the system as having precedence over setting up new streams in the service group.

The channel (or program) may be released from the bandwidth reclamation "disabled" state if one or more of the following occurs: (i) the channel (or program) is set back into a dynamic state and all timers have expired, (ii) all devices which were previously tuned to the channel (or program) have tuned away or send a SID=0 message, and the server is no longer aware of any devices which remain tuned thereto, or (iii) the device does not tune out either because it is a non-responder, or was unplugged.

In the third (iii) scenario, a pre-determined threshold (e.g., temporal) may be given after which the system will default a device to a non-responder status, and tear down the channel (or program). According to this embodiment, the state of the program may also be automatically changed back to a normal (i.e., bandwidth reclaimed) dynamic state. Also in this latter case, if the device which had been previously tuned to a preferred program was rebooted, initiated, and did not tune to the preferred program after that, the system may employ a "release on initiation" mechanism which releases a program or channel in this instance.

FIG. 11 illustrates an exemplary USRM interface 1100 for identifying a program as "preferred". As shown, the interface 1100 comprises an "OfferState" section 1102 to indicate a status for each program. The operator may set the "OfferState" 1102 to "static" in order to indicate that a program should not be switched out of delivery, or "dynamic" to allow for the dynamic provision of the program, such as according to traditional switched digital delivery schemes.

FIG. 12 illustrates an exemplary headend lineup 1200 on the SBM. The headend lineup 1200 comprises an "Admin Status" section 1202 to indicate a status for each program. The operator may set the "Admin Status" 1202 to "dynamic", thereby indicating that bandwidth may be reclaimed and the program torn down. Alternatively, service may be disabled ("disable service"), thereby disabling bandwidth reclamation with respect to that program. Additionally, the operator may delete or refresh a given program.

Identification of programs as "preferred" may be performed by a network operator and/or at a network entity. According to this embodiment, the preferred mode is implemented by providing a "StaticNow!" option. This may immediately setup the stream in every service group under its control and cause the SDV server (or other entity) to take any action necessary to ensure adequate bandwidth is available for the delivery of the preferred program when selected. As indicated previously herein, this may include the SDV server tearing down background streams early, defragmenting, rolling over into VOD QAM space, and/or tearing down streams with active users in order to make sure the preferred stream is provided.

In many instances, it may not be possible to establish a static channel (a channel which is always on) because the MSO will not be able to ensure that the channel is working and/or that adequate bandwidth will be available for it. Therefore, the operator may employ a preferred stream comprehensive ("scorched earth") "StaticNow!" approach. According to this embodiment, service groups with open bandwidth are identified and bandwidth reclaimed prior to the instantiation of the StaticNow! event (such as a pay-per-view event). As the time for the event gets closer, additional bandwidth is reclaimed this may include bending the rules for bandwidth reclamation to include tearing down streams prior to the expiration of an allotted time, tearing down streams with fewest viewers, etc. In this manner, it can be ensured that the channel is available at the start time.

In another embodiment, the operator may employ the preferred stream when it is known in advance that a high profile event (such as PPV event) is upcoming. In order to insure that the preferred channels will be available, but without having to keep checking service groups one by one and manually setting them to a "static" status, the method may include delaying an event in order to set an intrusive mode (discussed above) and add the channel. According to this embodiment, at some point (e.g., one hour) before start time, the "StaticNow!" approach is invoked.

FIG. 13 illustrates an exemplary interface 1300 for enabling a network operator to enter details, such as start and end dates/times for encryption and decryption of selected programs. In one embodiment, the interface 1300 is similar to a DNCS source/security mode box.

Reporting and Customer Service—

If, using the methods above, bandwidth is not available for the delivery of requested content, a "program not available" message may be provided to users. In one embodiment, the message may appear as discussed in co-owned, co-pending U.S. patent application Ser. No. 11/706,620 filed on Feb. 14, 2007 and entitled "METHODS AND APPARATUS FOR CONTENT DELIVERY NOTIFICATION AND MANAGEMENT", which is incorporated herein by reference in its entirety. As discussed therein, when content is requested by the subscriber during a time (or for a future time) where the network capacity or bandwidth available for delivery of that content is limited, a notification is sent to the subscriber to alert them of a potential unavailability of requested content. The subscriber may be offered the choice to either cancel the request or to accept delayed delivery of the requested content, for example. Numerous variants on this basic scenario are also disclosed, including inter alia: (i) providing the subscriber with a projected delivery or availability time for the requested content (either via the requesting modality; e.g., set-top box and cable network interface, or via another communication channel); (ii) allowing the subscriber to specify a date and/or time of delivery, such as one convenient to them; (iii) providing the subscriber with a "content ready" notification via their CPE, mobile device, etc. when the content is actually ready for delivery; and/or (iv) automatically programming or operating the subscriber's CPE or connected devices based on projected or actual delivery information. In another variant, the subscriber is provided with the opportunity to "trickle" download the content (which may in certain cases be at an unpredictable rate, and/or be completed at an unpredictable time), or download at a time solely determined by the network operator, in exchange for, e.g., a discount or other such consideration.

In one variant, the aforementioned messages to the user may be presented in the form of additional EBIF application pages with which the user may interact. Messaging or notification to the user may provide detailed reasons for the failure of a delivery request. Additionally, the EBIF application pages may (via e.g., the client application 404 of FIG. 4) report these detailed reasons for failure to deliver requested programming to a headend entity. Customer service representatives associated with the MSO may access and evaluate reports regarding these messages, such as when the customer calls in or otherwise contacts the MSO for assistance.

For example, the EBIF application 404 may report that a "not available" message was sent to the client (including a date, time, reason code, source ID, and frequency which STB was to tune), parametric values for the requesting device, code revisions, SDV diagnostic information, etc. Using this information, the customer service representatives can, inter alia, troubleshoot RF-related issues as SDV programs move around the RF spectrum. This mechanism can advantageously identify and alleviate problems such as when channel tune failures are related to a single frequency, etc. In one exemplary implementation, each local division of the MSO network may individually adjust the parameters dictating the amount and type of data received from the EBIF application as well.

If a program is not available for reasons other than constrained bandwidth, the aforementioned messaging (including EBIF application messaging) may be utilized to provide information regarding the delivery failure to the user and/or customer service representatives.

It is further appreciated that the aforementioned EBIF application 404, which provides the user an opportunity to designate themselves, their device, specific content, etc. as high priority or protected, may also be presented to the user at the "program not available" screen.

Business/Operational Rules Engine—

In another aspect of the invention, a so-called "decision" engine may be disposed at e.g., the controller 206, the CPE 106, the SDV server 202, response server/proxy 402, or other location (e.g., rendered as one or more computer programs disposed thereon). This engine comprises, in an exemplary embodiment, one or more software routines adapted to control bandwidth reclamation in the SDV architecture in order to achieve one or more goals relating to operations or business (e.g., profit or revenue or subscriber retention). Included within these areas are network optimization and reliability goals, increased maintenance intervals, increased subscriber or user satisfaction/longevity, increased subscription base, higher profit (e.g., from increased advertising revenues, more subscriber "views" of given content, greater flexibility in the types and locations of platforms from which the subscriber may access content, and so forth).

These decision rules may comprise a separate entity or process, and may also be fully integrated within other processing entities (such as the applications running on the aforementioned entities, and/or the EBIF client application 404), and controlled via e.g., a GUI displayed on a device connected to the relevant server, network entity, or even CPE. In effect, the rules engine comprises a supervisory entity which monitors and selectively controls content access and delivery operation (including bandwidth reclamation) at a higher level, so as to implement desired operational or business rules.

For example, the relevant entity may invoke certain operational protocols or decision processes based on information/inputs or requests received from the CPE (including e.g., priority assignments), conditions existing within the network (such as limited bandwidth availability), demographic data, geographic data, etc. However, these processes may not always be compatible with higher-level business or operational goals, such as maximizing profit or system reliability. Hence, when imposed, the business/operational rules can be used to dynamically (or manually) control access to and delivery of content (including reclaiming bandwidth and failure to deliver content). The decision rules may be, e.g., operational or business-oriented in nature, and may also be applied selectively in terms of time of day, duration, specific local areas, or even at the individual user level (e.g., via specific identification of the CPE or client device via a tuner identity (tuner ID), IP address, MAC address, or the like. In another variant, the application of these business or operational rules may occur according to a user-based login or "entitlements" profile of the type described at e.g., co-owned, co-pending U.S. patent application Ser. No. 12/536,724 filed on Aug. 6, 2009, issued as U.S. Pat. No. 8,341,242 on Dec. 25, 2012, and entitled "SYSTEM AND METHOD FOR MANAGING ENTITLEMENTS TO DATA OVER A NETWORK", which is incorporated herein by reference in its entirety. In other words, when a particular subscriber "logs in" to the system, it is immediately known whether the device on which the subscriber has logged on and/or subscriber him/herself are "high priority", and thus appropriate bandwidth reclamation rules may be utilized.

For example, one decision rule implemented by the decision engine may comprise disabling bandwidth reclamation according to a revenue- or profit-driven system. Utilizing this approach, content may be selected as exempt from bandwidth reclamation measures in part on the revenue or profit such delivery will bring to the MSO based on the content source. For example, certain content which brings more revenue to the MSO may be prioritized over other, less profitable content; when bandwidth is constrained, the more profitable, prioritized content is exempted from reclamation. In another variant, the ability to mark content, a device, or a subscriber as exempt from bandwidth reclamation may be a function of e.g., subscriber subscription level, time of day, etc. For instance, priority assignments may only be permitted for premium level or "Gold" subscribers; lower tier subscriber's will not be provided with an ability to establish themselves or content received thereto as exempt from reclamation.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of providing content in a bandwidth-constrained network, said network comprising a plurality of devices arranged in service groups, said method comprising:
    delivering a plurality of streams comprising a respective plurality of content to a first service group;
    receiving a request for content from a first device within said first service group, said requested content not being within said plurality of content delivered to said first service group;
    determining that delivery of said requested content would exceed available bandwidth limits;
    identifying one or more of said plurality of devices in said first service group which are exempt from reclamation based on one or more rules;
    providing a trigger to said one or more exempt devices;
    sending a message requiring a response to each of said plurality of devices in said first service group, said plurality of devices comprising one or more non-exempted ones of said plurality of client devices and said one or more of said plurality of devices in said first service group which are exempt, said trigger causing said one or more exempt devices to automatically respond to said message without respect to whether a user is present thereat;
    based at least in part on receiving a plurality of responses to said message, determining one or more of said plurality of delivered content to be removed from delivery;
    reclaiming bandwidth from at least one of said identified one or more of said plurality of delivered content from only individual ones of said one or more non-exempted ones of said plurality of client devices which did not respond to said message; and
    providing delivery of said requested content;
    wherein said one or more rules comprise at least a rule configured to indicate that content received at said one or more of said plurality of devices comprises priority content exempted from said removal; and
    wherein a user's manual entry of said response to said message is required from only said one or more non-exempted ones of said plurality of client devices.

2. The method of claim 1, wherein said one or more rules further comprise a rule configured to identify content which is not exempted.

3. A control apparatus configured to control delivery of content to a plurality of client devices over a network, said control apparatus comprising:
    at least one interface for communication within said network;
    a storage apparatus; and
    a digital processor, said digital processor configured to run at least one computer application thereon, said computer application comprising a plurality of instructions which are configured to, when executed:
    receive a request for content not currently being delivered;
    determine that sufficient bandwidth to fill said request is not available;
    send a signal to individual ones of said plurality of client devices for which interaction with content delivered thereto has not been detected in a predetermined amount of time, said individual ones of said plurality of client devices comprising one or more non-exempted ones of said plurality of client devices and one or more exempted ones of said plurality of client devices, said exempted ones of said plurality of client devices being determined based at least in part on one or more exemption rules;
    cause said one or more exempted ones of said plurality of client devices to respond to said signal without requiring a user's presence;
    require a user's manual entry of a response to said signal from only said one or more non-exempted ones of said plurality of client devices; and
    reclaim bandwidth from said one or more non-exempted ones of said plurality of client devices which did not respond to said signal, said one or more non-exempted, non-responsive ones of said plurality of client devices associated with one or more content streams that are not exempt for delivery of said requested content not currently being delivered;
    wherein said one or more exemption rules comprise a rule configured to indicate that content received at said individual ones of said plurality of client devices comprises priority content.

4. The control apparatus of claim 3, wherein said delivery of content to said plurality of client devices over said network utilizes a switched digital video server configured to deliver said content to said plurality of client devices in a service group.

5. The control apparatus of claim 3, wherein said one or more exemption rules are obtained via said interface from one of said plurality of client devices.

6. The control apparatus of claim 3, wherein said one or more exemption rules further comprise a rule configured to indicate that users of said individual ones of said client devices comprise priority users.

7. The method of claim 1, wherein said priority content is prioritized based at least on profitability of said priority content that is higher than that of other content.

8. A method of providing content in a bandwidth-constrained network, said network comprising a plurality of client devices arranged in service groups, said method comprising:
    delivering a plurality of streams comprising a respective plurality of content to a first plurality of client devices of one of said service groups;
    receiving a request for content from a first device of said first plurality of client devices;
    determining that delivery of said requested content would exceed available bandwidth limits;
    when said delivery of said requested content would exceed available bandwidth limits, determining whether said request may be serviced via a reclamation of bandwidth, identifying one or more of said first plurality of client devices which are exempt from reclamation based at least in part on one or more rules, said one or more rules comprising at least a rule configured to indicate content received at said one or more of said first plurality of client devices comprises priority content exempted from said removal;
    sending a message from an entity of said network to each of said first plurality of client devices of said one of said service groups, said first plurality of client devices of said one of said service groups comprising one or more non-exempted ones of said first plurality of client devices and said one or more of said first plurality of client devices identified as exempted, said message requiring a response from each of said first plurality of client devices of said one of said service groups;

reclaiming bandwidth from at least one of said plurality of content from at least one of said one or more non-exempted ones of said first plurality of client devices which did not respond to said message; and providing delivery of said requested content in place of said reclaimed at least one of said plurality of content;

wherein said one or more of said first plurality of client devices identified as exempted are configured to respond to said message without requiring a user's presence; and wherein a user's manual entry of said response to said message is required from said one or more non-exempted ones of said first plurality of client devices.

9. The method of claim 8, further comprising identifying one or more of said first plurality of client devices which are exempt from reclamation comprises using a media access control (MAC) address to determine exemption status.

10. The method of claim 8, wherein said identifying one or more of said first plurality of client devices which are exempt from reclamation comprises determining whether a subscriber is viewing content using one or more of a physical detection of said subscriber's presence, and/or a periodic evaluation of tuning activity.

11. A control apparatus configured to control delivery of content to a plurality of devices over a network, said apparatus comprising:
   at least one interface for communication within said network;
   a storage apparatus; and
   a digital processor, said processor configured to run at least one computer program thereon, said at least one program comprising a plurality of instructions which are configured to, when executed:
   receive a request for content;
   determine that sufficient bandwidth to fill said request is not available;
   identify one or more content streams being delivered to at least one of said devices, but not currently being utilized by said at least one device;
   based at least in part on one or more rules, exempt individual ones of said identified one or more content streams from reclamation, said one or more rules comprising at least one rule configured to indicate high priority content carried thereon;
   identify one or more of said plurality of devices which are exempt from reclamation, said identification of said one or more of said plurality of devices based at least in part on receipt of said exempted individual ones of said identified one or more content streams thereat;
   send a message to each of said plurality of devices, said plurality of devices comprising one or more non-exempted ones of said plurality of devices and one or more of said plurality of devices which are exempt from reclamation, said message configured to require a response from each of said plurality of devices; and
   reclaim bandwidth from said one or more non-exempted ones of said plurality of devices which did not respond to said message;
   wherein said plurality of devices which are exempt from reclamation are configured to respond to said message without requiring a user's presence; and
   wherein a user's manual entry of said response to said message is required from said one or more non-exempted ones of said plurality of devices.

12. The control apparatus of claim 11, wherein said identification of said one or more content streams not currently being utilized by said at least one device comprises utilization of one or more of a physical detection of a viewer's presence, and/or a periodic evaluation of tuning activity.

13. The control apparatus of claim 11, wherein said identification pf said one or more of said plurality of devices which are exempt from reclamation comprises utilization of a media access control (MAC) address thereof.

14. The control apparatus of claim 11, wherein said priority content is prioritized based at least on profitability of said priority content that is higher than that of other content.

15. The control apparatus of claim 11, wherein said plurality of instructions which are further configured to, when executed, troubleshoot radio frequency (RF) issues related to switched digital video (SDV) programs being moved around RF spectrum via an Enhanced TV Binary Exchange Format (EBIF) application configured to report a frequency at which content is received.

16. A method of providing content in a bandwidth-constrained network, said network comprising a plurality of client devices arranged in service groups, said method comprising:
   receiving a request for content;
   determining that sufficient bandwidth to fill said request is not available;
   identifying one or more content streams being delivered to at least one of said plurality of client devices, but not currently being utilized by said at least one client device;
   based at least in part on one or more rules, exempting said identified one or more content streams from reclamation, said one or more rules being rendered in computerized logic, said computerized logic configured to indicate a priority of first content carried on said identified one or more content streams;
   sending a first signal to each of said plurality of client devices, said plurality of client devices comprising one or more non-exempted ones of said plurality of client devices and one or more exempted ones of said plurality of client devices, said one or more exempted ones of said plurality of client devices being identified based at least in part on receipt of said one or more exempt content streams thereat, said first signal requiring a response from each of said plurality of client devices;
   causing said one or more exempted ones of said plurality of client devices to respond to said first signal without requiring a user's presence;
   requiring a user's manual entry of said response to said first signal from only said one or more non-exempted ones of said plurality of client devices; and
   reclaiming bandwidth from said one or more non-exempted ones of said plurality of client devices which did not respond to said first signal.

17. The method of claim 16, further comprising utilizing an Enhanced TV Binary Exchange Format (EBIF) application configured to report a frequency at which said requested content is received to troubleshoot one or more radio frequency (RF)-related faults created by switched digital video (SDV) programs being reallocated to different frequencies within available RF spectrum.

18. The method of claim 16, wherein said identifying said one or more content streams not currently being utilized by said at least one device comprises utilizing one or more of (i) a physical detection of a viewer's presence, and/or (ii) an evaluation of tuning activity.

19. The method of claim 16, wherein said priority of first content is determined based at least on a profitability of said first content being greater than that of other content.

20. The method of claim 16, further comprising delivering said requested content to a plurality of devices in a service group over a network via a switched digital video (SDV) server.

21. The method of claim 16, wherein said causing said one or more exempted ones of said plurality of client devices to respond to said first signal without requiring a user's presence comprises sending a second signal to said one or more exempted ones of said plurality of client devices, said second signal configured to download an automatic response application to run on said one or more exempted ones of said plurality of client devices, said automatic response application configured to automatically respond to said first signal.

22. The method of claim 16, wherein said each of said plurality of client devices to which said first signal is sent comprise client devices for which interaction with content delivered thereto has not been detected in a predetermined amount of time.

* * * * *